(12) United States Patent
Corston-Oliver et al.

(10) Patent No.: US 7,526,424 B2
(45) Date of Patent: Apr. 28, 2009

(54) SENTENCE REALIZATION MODEL FOR A NATURAL LANGUAGE GENERATION SYSTEM

(75) Inventors: Simon Corston-Oliver, Seattle, WA (US); Michael Gamon, Seattle, WA (US); Eric Ringger, Issaquah, WA (US); Robert C. Moore, Mercer Island, WA (US); Zhu Zhang, Ann Arbor, MI (US)

(73) Assignee: Microsoft Corporation, Redmond, WA (US)

( * ) Notice: Subject to any disclaimer, the term of this patent is extended or adjusted under 35 U.S.C. 154(b) by 1206 days.

(21) Appl. No.: 10/103,163

(22) Filed: Mar. 20, 2002

(65) Prior Publication Data

US 2003/0182102 A1 Sep. 25, 2003

(51) Int. Cl.
*G06F 17/27* (2006.01)
(52) U.S. Cl. ............... 704/9; 704/2; 704/5; 704/277
(58) Field of Classification Search ............... 704/1–10, 704/277; 707/3, 4, 6
See application file for complete search history.

(56) References Cited

U.S. PATENT DOCUMENTS

| 4,887,212 | A |   | 12/1989 | Zamora et al. ............... 364/419 |
| 5,101,349 | A |   | 3/1992 | Tokuume et al. ............ 364/419 |
| 5,111,398 | A | * | 5/1992 | Nunberg et al. ................ 704/9 |
| 5,146,406 | A |   | 9/1992 | Jensen ......................... 364/419 |
| 5,467,425 | A | * | 11/1995 | Lau et al. ..................... 704/243 |
| 5,640,487 | A | * | 6/1997 | Lau et al. ..................... 704/243 |
| 5,805,832 | A | * | 9/1998 | Brown et al. ................... 711/1 |
| 5,930,746 | A |   | 7/1999 | Ting ................................ 704/9 |
| 5,995,922 | A | * | 11/1999 | Penteroudakis et al. ........ 704/9 |
| 6,278,967 | B1 | * | 8/2001 | Akers et al. ..................... 704/2 |
| 6,374,220 | B1 |   | 4/2002 | Kao ............................ 704/255 |
| 6,470,306 | B1 | * | 10/2002 | Pringle et al. ................... 704/3 |
| 6,490,549 | B1 | * | 12/2002 | Ulicny et al. .................. 704/10 |

(Continued)

FOREIGN PATENT DOCUMENTS

EP 1 280 069 1/2003

(Continued)

OTHER PUBLICATIONS

Michael Gamon et al. "Amalgam: A machine-learned generation module". Jun. 11, 2002. Microsoft Research, Technical Report MSR-TR-2002-57.

(Continued)

*Primary Examiner*—Huyen X. Vo
(74) *Attorney, Agent, or Firm*—Westman, Champlin & Kelly, P.A.

(57) ABSTRACT

The present invention is a sentence realization system that processes an abstract linguistic representation (ALR) of a sentence into a structure that can be fully realizable. The system includes a tree conversion component that receives the ALR and generates a basic syntax tree from the ALR. A global movement component then receives the basic syntax tree and hierarchically orders child nodes in that syntax tree relative to ancestor nodes. An intra-constituent ordering component then establishes a linear order among the nodes such that the syntax tree is fully ordered. A surface cleanup component receives the fully ordered tree and performs a number of realization operations to generate surface realizations for constituents that are still represented in an abstract way in the fully ordered syntax tree.

95 Claims, 19 Drawing Sheets

U.S. PATENT DOCUMENTS

| | | | |
|---|---|---|---|
| 6,492,989 B1* | 12/2002 | Wilkinson | 345/440 |
| 6,493,663 B1* | 12/2002 | Ueda | 704/9 |
| 6,606,597 B1* | 8/2003 | Ringger et al. | 704/270 |
| 6,640,207 B2* | 10/2003 | Witschel | 704/9 |
| 6,760,695 B1* | 7/2004 | Kuno et al. | 704/9 |
| 7,003,445 B2 | 2/2006 | Humphreys et al. | 704/9 |
| 7,275,029 B1 | 9/2007 | Gao et al. | 704/9 |
| 2002/0026306 A1 | 2/2002 | Bangalore et al. | |
| 2002/0156763 A1* | 10/2002 | Marchisio | 707/1 |
| 2005/0171757 A1* | 8/2005 | Appleby | 704/2 |

FOREIGN PATENT DOCUMENTS

| | | |
|---|---|---|
| EP | 1 462 948 A1 | 9/2004 |
| EP | 03006251.7 | 12/2005 |
| JP | 03225389 A | 10/1991 |
| JP | 04024767 A | 1/1992 |
| WO | WO 01/37126 A2 | 5/2001 |

OTHER PUBLICATIONS

Takako Aikawa et al., "Generation for Multilingual MT", Sep. 2001, European Association for Machine Translation Summit VIII, Spain.

B. Lavoie et al., "A fast and portable realizer for text generation systems" 1997.

L. Iordanskaja et al., Generation of extended bilingual statistical reports 1992.

T. Becker et al., "An efficient kernel for multilingual generation in speech-to-speech dialogue translation" 1998.

D. Beeferman et al. Cyberpunc: A lightweight punctuation annotation system for speech, 1998.

Official Notice of Rejection of Japanese Patent Application No. 2003/074472 mailed Nov. 13. 2007.

Official Notice of Rejection of Japanese Patent Application No. 2004-075165 mailed Apr. 6, 2007.

European Search Report for European Patent Application No. 04006714.2 mailed Jul. 6, 2004.

Notice of Office Action of Chinese Patent Application No. 200410032691 mailed Apr. 20, 2007.

Johnson, Mark "Joint and Conditional Estimation of Tagging and Parsing Models", Proceedings of the 39th Annual Meeting on Association for Computaional Linguistics; France Jul. 6-11, 2001, pp. 322-329.

Wilcock et al., G "Head-Driven Generation with HPSG", Proceedings of the 17th International Conference on Computational Linguistics - vol. 2; Montreal, Quebec, Canada; Aug. 10-14, 1998, pp. 1392-1397.

Charniak, E. "A Maximum-Entropy-Inspired Parser", Proceedings of the 1st meeting of the North American Chapter of the Association for Computational Linguistics, 2000, pp. 132-139.

Clarniak, E. "Immediate-Head Parsing for Language Models", Proceedings of the 39th Annual Meeting of the Association for Computational Linguistics, Jul. 9, 2001, pp. 116-123.

Charnink, E. "STATISTICAL Techniques for Natural Language Parsing", AI Magazine vol. 18, No. 4, Winter 1997, pp. 33-44.

Herman, Peter A. "POS Tags and Decision Trees for Language Modeling", Joint SIGDAT Conference on Empierial Methods in Natural Language Processing and Very Large Corpora, College Park, Maryland, Jun. 1999.

Langkilde, I. "Forest-Based Statistal Sentence Generation", Association for Computational Linguistics 1st Meeting of the North American Chapter of the Association for Computational Linguistics, Apr. 29, 2000, pp. 170-177.

Langkilde-Geary, J. "An Empirical Verification of Coverage and Correctness for a General-Purpose Sentence Generator", Second International Natural Language Generation Conference, Harriman, New York, Jul. 2002, pp. 17-24.

Magerman, D. "Statistical Decision-Tree Models for Parsing", Proceeedings of ACL 1995, Cambridge, Massachusetts, pp. 276-283.

Langkilde et al., I. "The Pratical Value of N-Grams in Generation", Proceedings in 9th International Workshop on Natural Language Generation, Niagara-on-the-Lake, Ontario, 1998, pp. 248-255.

Srinivas Bangalore and Owen Rambow, "Corpus-Based Lexical Choice in Natural Language Generation", Annual Meeting of the ACL, Proceedings of the 38th Annual Meeting on Association for Computational Linguistic, Hong Kong, pp. 464-471, 2000.

Srinivas Bangalore and Owen Rambow, "Exploiting a Probabilistic Hierarchical Model for Generation", International Conference on Computational Linguistics, Proceedings of the 18th Conference on Computational Linguistics, vol. 1, Saarbrucken, Germany, pp. 42-48, 2000.

Adwait Ratnaparkin, "Trainable Methods for Surface Natural Language Generation", ACM International Conference, Proceedings Senes, vol. 4, Proceedings of the first conference on North American chapter of the Association for Computational Linguistics, Seattle, Washington, pp. 194-201, 2000.

Irene Langkilde and Kevin Knight, "Generation that Exploits Corpus-Based Statistical Knowledge", Annual Meeting of the ACL, Proceedings of the 36th Annual Meeting on Association for Computational Linguistics, vol. 1, Montreal, Quebec, Canada, pp. 704-710, 1998.

Irene Langkilde, "Thems Proposal - Automatic Sentence Generation Using a Hybrid Statistical Mixtel of Lexical Collocations and Synthetic Relations", 1999.

* cited by examiner

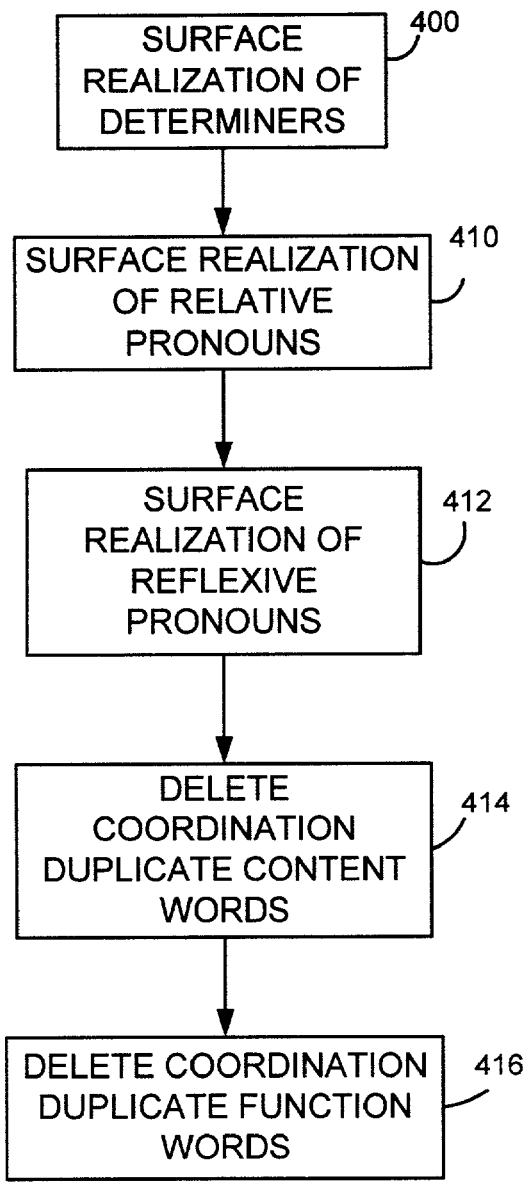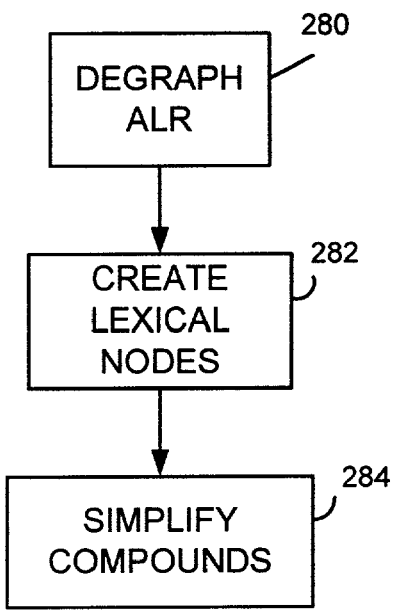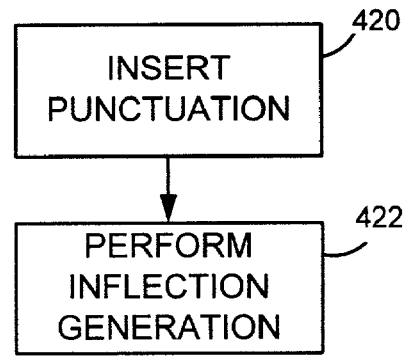

aufessen1 ({Verb} +Pres +Indicat +Proposition +T1)
    \Tsub——Hans1 ({Noun} +Masc +Pers3 +Sing +PrprN +Anim +Conc +Fnme +Humn +Nme)
    \Tobj——Kartoffel1 ({Noun} +Def +Fem +Pers3 +Plur +Count)
              \Attrib—ernten1 ({Verb} +Pres +Perf +Indicat +Proposition +T1)
                        \Time——gestern1 ({Adv} +Tme)
                        \Tsub——er1 ({Pron} +Masc +Pers3 +Sing +FindRef)
                                \Refs——Hans1
                        \Tobj——Kartoffel1
    \LTopic

FIG. 5

```
aufessen1 ({Verb} +Pres +Indicat +Proposition +T1 +Vsecond)
├─Tsub──Hans1 ({1} {Noun} +Nom +Masc +Pers3 +Sing +PrprN +Spellout_prob +Anim +Conc +Fnme +Humn +Nme)
├─Tobj──Kartoffel1 ({2} {Noun} +Def +Acc +Fem +Pers3 +Plur +Spellout_prob +Count)
│       ├─Inserted──DefDet1 ({Adj})
│       └─Attrib──ernten1 ({Verb} +Pres +Perf +Indicat +Proposition +T1 +Vfinal)
│               ├─Inserted──haben1 ({Verb})
│               ├─Time──gestern1 ({Adv} +Tme)
│               ├─Tsub──er1 ({Pron} +Nom +Masc +Pers3 +Sing +FindRef)
│               │       └─Refs──Hans2 ({-1} {Noun} +Masc +Pers3 +Sing +PrprN +Anim +Conc +Fnme +Humn +Nme)
│               └─Tobj──Relpro1 ({Pron} +Acc +Pers3 +Plur)
└─Topic──Hans3 ({-1} {Noun} +Masc +Pers3 +Sing +PrprN +Anim +Conc +Fnme +Humn +Nme)
```

FIG. 7

```
{Segtype    VERB
 Nodetype   STEM
 Nodename   STEM2
 Ft-Lt      2-2
 String     "isst"
 CopyOf     REC947
 Lex        "isst"
 Lemma      "essen"
 Bits       Pers3 Sing Pres
            Indicat IO T1acc
 Vptc       {mit nach an weg durch ab voll auf aus über hinter satt}
 Infl       Verb-essen
 Parent─────VP11 "isst"
 Deriv      {essbar}
 SemNode────aufessen3 }
```

FIG. 18

SENTENCE REALIZATION MODEL FOR A NATURAL LANGUAGE GENERATION SYSTEM

BACKGROUND OF THE INVENTION

The present invention deals with natural language generation. More specifically, the present invention deals with sentence realization in a natural language generation system.

A natural language generation system generates a text from a linguistic representation of a sentence. Such systems typically include a text planner or content selection portion, a sentence planner portion and a sentence realization portion.

The text planner or content selection component obtains, as an input, content which is to form the basis of the realized text. The sentence planning portion determines how to organize the content into sentences, and the sentence realization component generates the actual output sentence.

For example, assume that the text planner provides content words such as "Little Red Riding Hood", "walking", and "grandmother's house". The sentence planner determines that "Little Red Riding Hood" is the agent, the action is "walking", and the destination is "grandmother's house". The sentence planner provides this abstract linguistic representation as an input to the sentence realization component. The sentence realization component performs the complex task of mapping from the abstract linguistic representation to an actual sequence of words and punctuation corresponding to that abstract linguistic representation. The actual sequence of words and punctuation is the realized sentence (also referred to as the surface string) which is output by the system.

Prior systems which have attempted sentence realization have tended to be one of two different types of systems. The first type of system is a hand-coded, rule-based system that successively manipulates the linguistic representation to produce representations from which the surface string can simply be read. In such systems, computational linguists typically explicitly code strategies for stages ranging from planning texts and aggregating content into a single sentence, to choosing appropriate forms of referring expressions, performing morphological inflection and formatting an output. Such systems have typically included a very large volume of handwritten code which is extremely time consuming to produce. In addition, such hand-coded systems encounter great difficulty in adapting to new domains, and even more difficulty adapting to different languages.

The second type of sentence realization system which was typically used in the past attempted to generate candidate sentences directly from the input linguistic representation. For example, such systems have been used in highly domain specific applications (such as in flight reservations) in which there are a finite number of templates, and the content words are simply assigned to the various slots in the templates. The filled in templates are used to directly generate an output.

Other similar systems enumerate all possible candidate sentences which can be generated from the abstract linguistic representation of the sentence. In these cases, the candidate sentences are evaluated using statistical techniques that prefer the sentences in which combinations of words most closely match combinations observed in real text. However, for a given linguistic representation, the number of candidate sentences to be examined can be extremely large. This leads to slow computation times as each candidate must be evaluated. Furthermore the techniques used to evaluate the candidate sentences often perform poorly on long distance linguistic phenomena. This makes such systems ill-suited to genres of languages in which long distance phenomena are common.

Examples of systems discussed above are set out in Langkilde, I. and K. Knight, 1998, *The Practical Value of N-Grams in Generation*, Proceedings of the 9th International Workshop on Natural Language Generation, Niagara-on-the-Lake, Canada, pages 248-255; and Langkilde, I. and K. Knight, 1998, *Generation that Exploits Corpus-Based Statistical Knowledge*, Proceedings of the 36th Annual Meeting of the Association for Computational Linguistics and 17th International Conference on Computational Linguistics (COLING-ACL 1998), Montreal, Quebec, Canada, pages 704-710.

In the first of these systems, word bi-grams are used instead of deep symbolic knowledge to decide among alternative output sentences. Two sets of knowledge-engineered rules operate on the input specification to produce candidate output sentences. One set of rules performs one-to-many mappings from under-specified semantics to possible syntactic formulations, fleshing out information such as definiteness and number that might be missing in practical generation contexts such as Japanese-to-English machine translation systems. The second set of rules, which include sensitivity to the target domain, transforms the representations produced by the first module to yield still more candidate sentences that are represented as a word lattice. Word bi-grams are used to find the optimal traversal of the lattice, yielding the best-ranked output sentence. Morphological inflection is performed by simple table look up.

This system is one which generates a very large number of candidate sentences which must be processed. For example, in one of the work examples in Langkilde, I. and K. Knight, the input semantic form includes five lexical nodes in such relationships as AGENT, DESTINATION, and PATIENT. The word lattice that results from this semantic input contains more 11 million possible paths, with the top-ranked candidate being "Visitors who came in Japan admire Mount Fuji." Another such example (for which the semantic input representation is not given) appears to contain only two content words that are transformed into a lattice containing more than 155,000 paths to yield the top-ranked candidate "I can not betray their trust."

The use of bi-grams in this system also leads to other disadvantages. Bi-grams are unable to capture dependencies among non-contiguous words. Increasing the number of terms to tri-grams, or even higher order n-grams, raises the well-known problem of data sparsity.

Other prior work relevant to the parts of the present disclosure referred to below as the order model includes "generative" parsing models. Such models are employed in the parsing (i.e., syntactic analysis) process to assign probabilities to alternative syntactic trees. The name "generative" indicates that the model can also be sampled randomly to generate a sentence structure according to the distributions in the model. Such a model can assign a probability to possible constituent constructions, given relevant features during the generation process, as in the parsing process.

Examples of such parsing models are set out in the following publications. Eugene Charniak, "A Maximum-Entropy-Inspired Parser", appearing in the Proceedings of NAACL-2000, Seattle, Wash., pp. 132-139. Also: Eugene Charniak, "Immediate-Head Parsing for Language Models" appearing in the Proceedings of the 39th Annual Meeting of the Association for Computational Linguistics (2001), Toulouse, France, pp. 116-123. In the work described in these papers, assessments of constituent probability are conditioned on contextual information such as the head of the constituent. One aspect of the order model in the present invention that sets the work to be disclosed here apart from the models of Charniak and from prior generative parsing models is the use of semantic relations available to the generation task.

SUMMARY OF THE INVENTION

The present invention is a sentence realization system that processes an abstract linguistic representation (ALR) of a sentence into a structure that can be fully realizable. The system includes a tree conversion component that receives the ALR and generates a basic syntax tree from the ALR. A global movement component then receives the basic syntax tree and hierarchically orders child nodes in that syntax tree relative to ancestor nodes. An intra-constituent ordering component then establishes a linear order among the nodes such that the syntax tree is fully ordered. A surface cleanup component receives the fully ordered tree and performs a number of realization operations to generate surface realizations for constituents that are still represented in an abstract way in the fully ordered syntax tree.

In one embodiment a punctuation insertion component then inserts punctuation into the syntax tree to obtain a fully ordered, punctuated syntax tree. This tree can simply be read off to obtain a realized sentence.

In various embodiments, the system also includes an inflection generation component that is placed in the pipeline after the punctuation insertion component. The inflection generation component modifies the syntax tree to reflect correct inflection based on attributes in the syntax tree.

In another embodiment, the ALR is an underspecified representation that needs to be fleshed-out prior to being converted into a basic syntax tree. In that embodiment, a flesh-out component adds syntactic labels to the nodes in the ALR. In other embodiments, the flesh-out component can also insert function words and assign probability of realization to logical subjects and logical objects in the ALR. Similarly, the flesh-out component can identify the case of noun phrases and can also assign verb position to verbs in the ALR.

In yet another embodiment, the ALR is received as a logical form graph, or another type of graph structure. The ALR is first be degraphed into a tree-like structure for further processing. Thus, a preprocessing component is included which degraphs the ALR.

BRIEF DESCRIPTION OF THE DRAWINGS

FIG. 4 is a flow diagram better illustrating preprocessing of the input.

FIG. 5 illustrates a data structure representative of the output of the preprocessing component.

FIG. 7 illustrates the output of the fleshing out component.

FIG. 14 is a flow diagram illustrating the operation of a surface clean-up component.

FIG. 16 is a flow diagram illustrating the operation of the punctuation insertion component and the inflectional generation component.

FIG. 18 is one illustrative embodiment of a record for a node that is input to the inflectional generation component.

DETAILED DESCRIPTION OF ILLUSTRATIVE EMBODIMENTS

The present invention is described with respect to a sentence realization system. The present invention includes the overall sentence realization system and methods involved in that system. The present invention also, however, includes the individual sub-components or modules of the overall sentence realization system, in and of themselves. However, those modules or sub-components are described in the context of sentence realization, for better understanding.

It should also be noted that the description of the present invention set out below uses, as an example, a sentence in the German language. The German language presents a rather large number of hurdles which must be overcome by a sentence realization system and is thus used to exhibit the versatility of the present system in handling such situations. However, the present invention can be used with substantially any other language as well, and is not to be limited to the German language.

Of course, a number of the components or modules described herein are specific to the German language and can simply be removed or disabled when processing in other languages. Similarly, a number of modules specific to other languages can easily be added to the overall system of the present invention, to accommodate certain irregularities or phenomena in a given target language.

Figure 1:
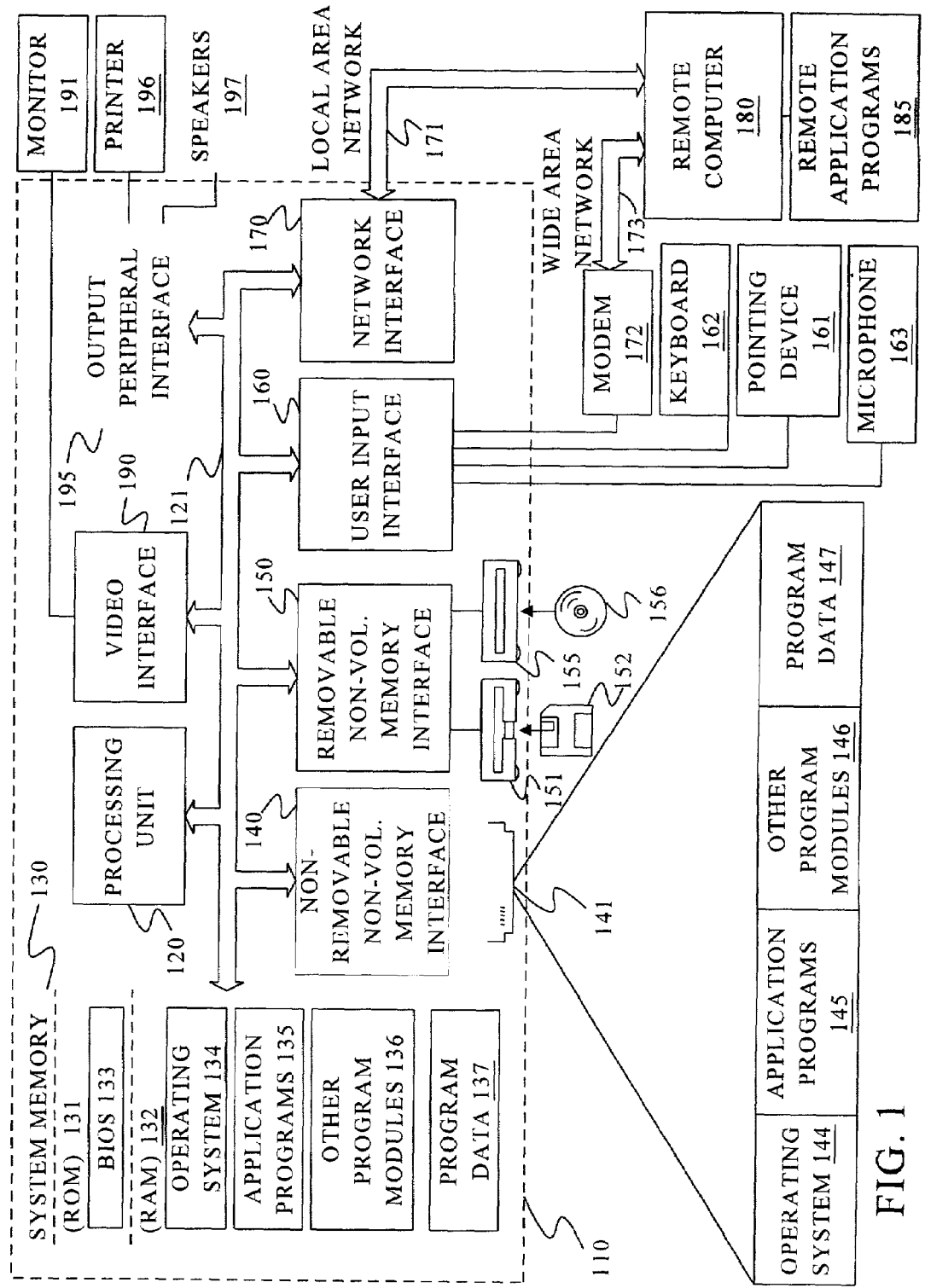
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
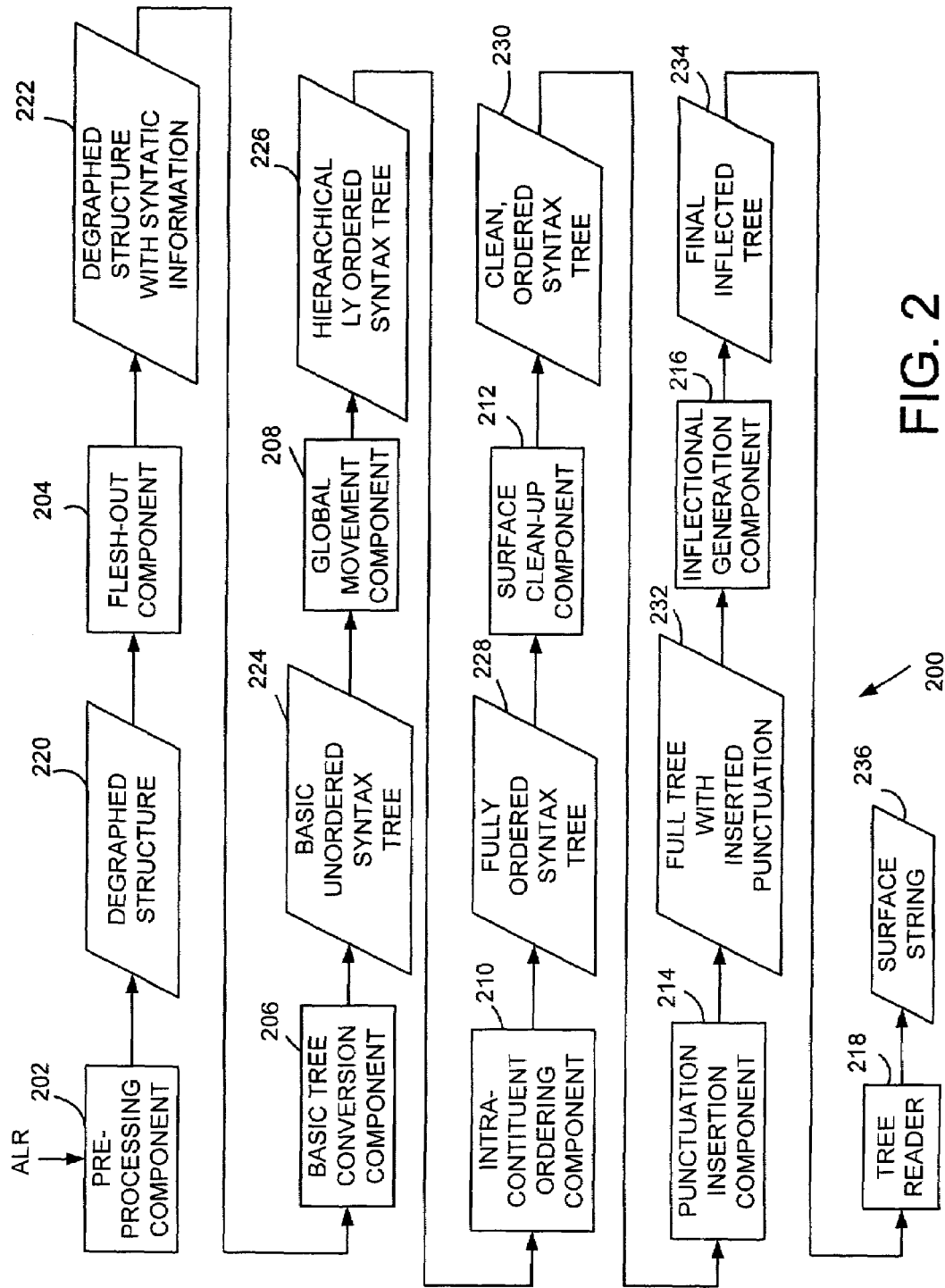
FIG. 2 is a block diagram of one embodiment of the present invention, illustrating data flow.

FIG. 2 is a block diagram (also illustrating data flow) of sentence realization component 200 in accordance with one embodiment of the present invention. Sentence realization component 200 includes preprocessing component 202, flesh-out component 204, basic tree conversion component 206, global movement component 208, intra-constituent ordering component 210, surface cleanup component 212, punctuation insertion component 214, inflectional generation component 216 and tree reader component 218. The overall operation of system 200 is now described with a detailed discussion of the components of system 200 reserved for later Figures.

System 200 receives as an input an abstract linguistic representation of an input sentence. In the embodiment discussed herein, the input is a logical form. However, it will be appreciated that substantially any other syntactic or semantic representation of a sentence can be received as an input as well. A logical form structure is set out in greater detail in U.S. Pat. No. 5,966,686 issued Oct. 12, 1999 to Heidorn et al. entitled METHOD AND SYSTEM FOR COMPUTING SEMANTIC LOGICAL FORMS FROM SYNTAX TREES.

Preprocessing component 202 processes the abstract linguistic representation by degraphing the input. For example, where the input is a logical form, it is a graph structure, rather than a tree structure. Thus, the input structure is degraphed and converted into a more tree-like structure. Preprocessing component 202 also adds lexical information to the input structure, such as through a dictionary lookup operation. Preprocessing component 202 can also perform simplification of compounds. The output of preprocessing component 202 is a degraphed structure 220 which has additional information added thereto.

Flesh-out component 204 receives data structure 220 and adds syntactic information to that data structure. Flesh-out component 204 also inserts function words such as determiners, auxiliaries, semantically empty prepositions, relative pronouns, etc. Component 204 also assigns case features and verb-position features, as well as spell-out probabilities for noun phrases in subject or object positions. Flesh-out component 204 provides, as an output, structure 222 which is a degraphed structure with syntactic and other information added thereto.

Basic tree conversion component 206 receives data structure 222 and converts that data structure into a basic syntax tree. Component 206 reads off a syntactic tree structure from the degraphed data structure 222 and splits separable prefixes from their stem. Component 206 can also introduce a syntactic representation of coordination, and reverse certain syntactic dominance relations. Component 206 provides, as an output, a basic unordered syntax tree 224.

Global movement component 208 receives structure 224 and performs global movement or global ordering. Global movement involves the movement of question words (Wh words), relative pronouns, and a process known in linguistic theory as raising. Component 208 also performs extraposition processing. Component 208 provides, as an output, structure 226 in which each constituent has the correct parent, although the constituents in 226 are unordered.

Intra-constituent ordering component 210 receives structure 226 as an input and fully orders the nodes in the syntax tree to provide a fully ordered syntax tree 228 at its output.

Surface cleanup component 212 receives structure 228 and performs surface cleanup operations, such as surface realization of determiners, relative pronouns and reflexive pronouns. Component 212 also deletes duplicated material in coordination. Component 212 provides, as an output, a clean, fully ordered syntax tree 230.

Punctuation component 214 receives structure 230 and inserts punctuation marks into the syntax tree. Component 214 provides as its output the clean, fully ordered syntax tree, with punctuation inserted as indicated by numeral 232.

Inflectional generation component 216 receives structure 232 and generates final inflection and outputs a final inflected tree 234. Tree reading component 218 simply reads tree 234 and provides, as its output, surface string 236 (or realized sentence 236) by simply applying all of the information in final inflected tree 234.

Each of the components shown in FIG. 2 will now be discussed in greater detail with respect to an example. The example sentence discussed herein is in the German language and is as follows:

"Hans isst die Kartoffeln auf, die er gestern geernet hat"

This sentence translates as "Hans eats up the potatoes which he has harvested yesterday." After the operation of the present system, this sentence is the surface string 236 which will be produced based on a linguistic representation of this sentence input to the system. It should also be noted that this example sentence will not illustrate each and every operation performable by the present invention, but has been chosen as an illustrative example only.

Figure 3:
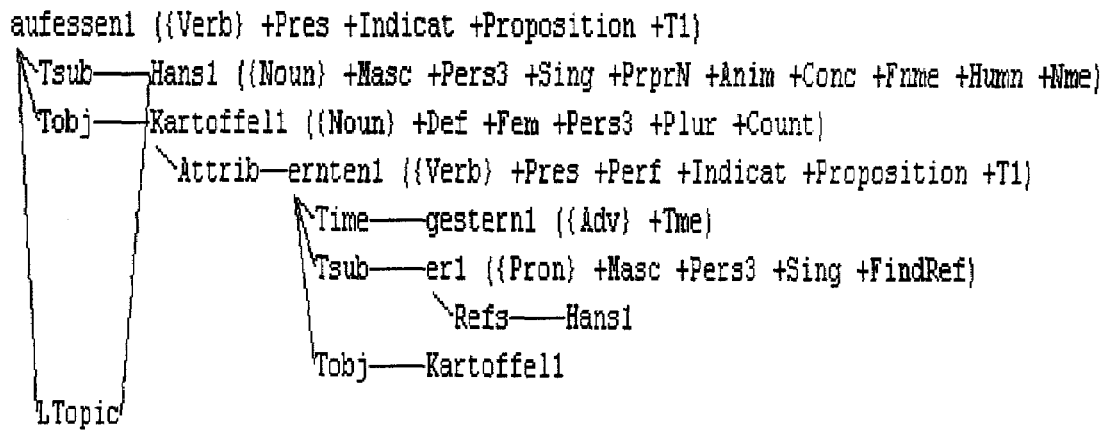
FIG. 3 is an exemplary semantic representation of a sentence used as an input to the present invention, and is embodied as a logical form.

FIG. 3 illustrates the abstract linguistic representation input to system 200. FIG. 3 shows that the abstract linguistic representation is embodied as a logical form in the present example, but could be substantially any other abstract linguistic representation which includes content words and syntactic or semantic information that represents the sentence to be generated.

Preprocessing component 202 receives the linguistic representation shown in FIG. 3 and performs a number of operations. FIG. 4 is a flow diagram better illustrating the operation of preprocessing component 204. FIG. 4 illustrates that the logical form is first degraphed as illustrated by block 280. In other words, a structure is created such that each node has at most one parent node. This operation creates a tree structure that facilities conversion into a syntactic tree in the following stages. Some nodes need to be duplicated in order to create the tree structure from the graph. If the nodes are created, indices are added which link them to their counterparts, thus preserving the information that the nodes were originally a single node in the graph. Such indices are referred to as "CoIndices".

During the degraphing operation, certain logical form attributes are ignored. Such attributes include:
1. System-internal bookkeeping attributes of no linguistic interest;
2. Attributes which receive special handling elsewhere in the degraphing code (such as ParentAttrs (storing labels on arcs to parent node s), Parents (storing pointers to parent nodes, and CoIndex)); and 3. Attributes used only for advanced semantic processing, but not yet considered reliable or useful for generation.

Tables A, B and C set out in Appendix 1 hereto illustrate the pseudocode for the degraphing algorithm used in this example. It should be noted that this is but one example of a degraphing algorithm and substantially any other degraphing algorithm which changes the structure from a graph to a tree-like structure can be used. Table A is the pseudocode for a function referred to as DeepDegraphLF. This function calls the DeepDegraphLFsubgraph function set out in Table B. In that function, the logical form is traversed an nodes with more than one parent are duplicated. The indices are assigned so that subsequent processing can determine identity of nodes. The function shown in Table B makes reference to a list of Func_LF_Attrs, which is a list of attributes which lie outside of the argument structure of a predicate. These attributes CleftFOC (the focus of a left construction), Ltopic and L_top (topics), and CoCoords (a coordinated sibling node). The function shown in Table B, in turn, calls the CopyLFStruct function, which performs a deep copy or shallow copy operation, as appropriate, and maintains the CoIndex attribute. The pseudocode for the CopyLFStruct function is set out in Table C.

Once the logical form has been degraphed, the nodes are lexicalized as indicated by block 282. In other words, a lexical look up is performed in a lexical database (such as an electronic dictionary) on each of the lexical items present in the graph. The dictionary information is stored in an attribute in the records in the graph. Finally, for the present example in the German language, compound nouns are simplified as indicated by block 284.

Figure 6:
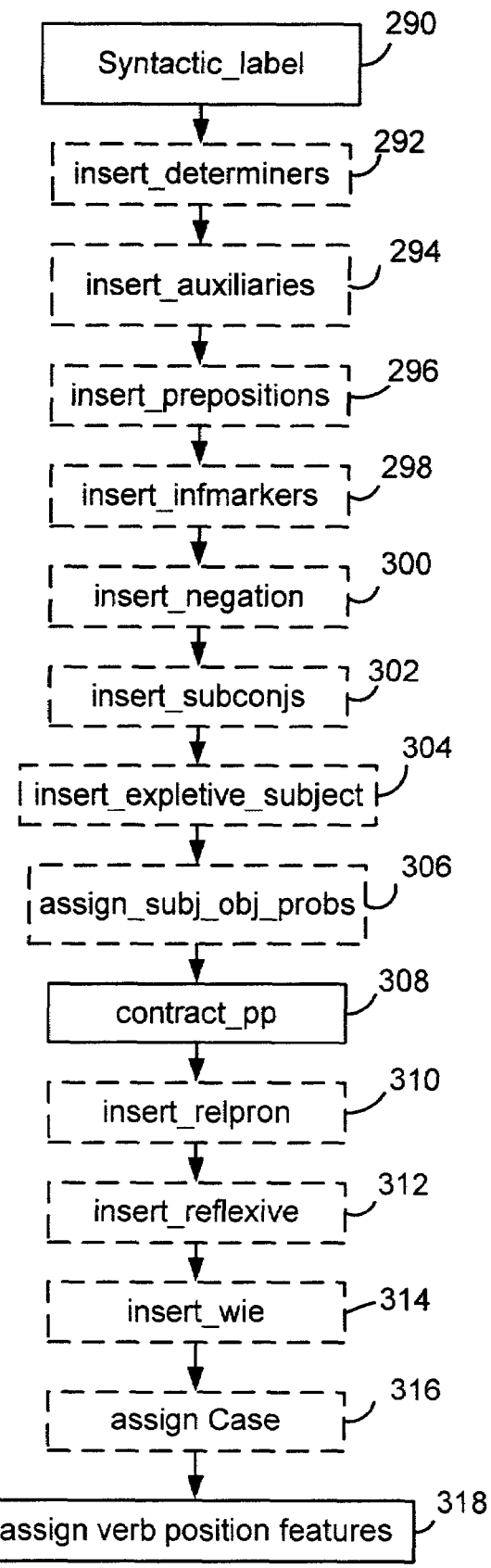
FIG. 6 is a flow diagram better illustrating the operation of the fleshing out component.

FIG. 5 is a diagram of the degraphed, lexicalized structure 220 that is output by preprocessing component 202. That structure is input to flesh-out component 204. FIG. 6 is a flow diagram better illustrating the operation of flesh-out component 204.

During the flesh-out processing, information is added to the degraphed structure shown in FIG. 5. Typically, this information relates to syntactic realization details that have been normalized at the more abstract logical form level of representation. As shown in FIG. 6, syntactic labels are first assigned to the nodes in the degraphed logical form shown in FIG. 5. This is indicated by block 290 in FIG. 6 and is illustratively performed by a decision tree classifier. The syntactic labels are added as attributes on the nodes. A more complete description of each of the decision tree classifiers referenced herein is set out in Appendix 2 to the present specification, and the reader is referred there for further details.

Once the syntactic labels are added to the nodes, function words are inserted in the degraphed structure. Since function words carry little semantic information, they are not in the logical form graph input to the system and thus must be added. The insertion of function words includes, in the example discussed herein, the insertion of determiners, auxiliaries, prepositions, infinitival markers, negators, subordinating conjunctions, and expletive subjects. Each of these function words is illustratively inserted by a decision tree classifier and the insertion of these function words is illustrated by numerals 292-304 in FIG. 6.

Again, reference is made to Appendix 2 herein for discussion of the appropriate decision tree classifiers. Briefly, however, abstract determiners, for example, include definite determiners (DefDet), indefinite determiners (InDefDet), WhDeterminers (WhDet), and demonstrative determiners (ProxlDet and DistlDet). The surface form of these determiners is fixed at a later stage in the processing (in the surface cleanup component 212).

The insertion of prepositions includes insertion of prepositions which have a purely syntactic function. For example, in the German language, the prepositions "von" and "durch" used in the passive construction have a purely syntactic function and are inserted.

The insertion of infinitival markers includes insertion of, for example, "zu". Subordinating conjunctions that are inserted include those such as "dass" and "ob". Expletive subjects include those such as the semantically empty grammatical subject "es".

After the function words are inserted, logical subjects and objects are assigned a probability for "spell-out", illustratively by a decision tree classifier. This is indicated by block 306 in FIG. 6. More specifically, a probability of the logical subjects or objects being realized in the surface string is assigned. Logical subjects of infinitival clauses, for example, should not be overtly represented in the surface string.

Next, logical form nodes of prepositional proforms such as "dadurch" and "damit" etc., are contracted to their surface string. This is performed by a simple rule-based function and is indicated by block 308 in FIG. 6. This module is substantially related only to some Germanic languages. In the German language, such forms contain a preposition, "mit" or "für" in this example) and a pronominal element "da". In the logical form, these words are decomposed into a representation similar to that of a full prepositional phrase, such as the prepositional phrase "mit das" (with that) and, "für das" (for that).

Abstract relative pronouns (RelPro) are next inserted. This is indicated by block 310. Relative pronouns are later spelled out in the surface realization, during the surface cleanup process illustrated by block 212 in FIG. 2. For example, in the logical form, relative pronouns are replaced by a copy of the semantic node they are referring to. Thus, to obtain the surface realization, this copy must be replaced by the relative pronoun. The information necessary to do this is contained in the fleshed-out logical form and this operation is performed by a simple rule-based function.

Next, reflexive pronouns are inserted. This is indicated by block 312 and is again performed by a rule-based function. Reflexive pronouns are typically used in two contexts in the German language: there are inherently reflexive verbs, where the reflexive does not carry any semantic role, and there are normal transitive verbs used reflexively. In the first context, the reflexive does not appear in the logical form at all (but the verb is marked with a special feature ReflexSens) In the second context, it appears as a copy of the node that it refers to. Insertion of reflexive pronouns identifies these two different contexts and inserts a reflexive pronoun in the first context, and replaces the copy with the reflexive pronoun in the second context.

The Wh adverbial "wie" is then inserted as indicated by block 314. "Wie" is a Wh adverb, like its English counterpart "How". It is not represented as a node in the logical form of the present example, since its only function is to carry the Wh feature. Insertion of "wie" is a simple operation that is triggered if there is a "Wh" feature on a node, but no other Wh-carrying element has yet been inserted.

Case features and verb position features are then assigned by decision tree classifiers. This is indicated by blocks 316 and 318 in FIG. 6. Again, reference is made to Appendix 2 hereto for a more complete discussion of these decision tree classifiers. Briefly, however, case is an important feature in the German grammar. Constituent order is relatively free in the German language, and often only the case-marking on a noun phrase indicates whether it is to be interpreted as the subject, object, or indirect object of a sentence. During sentence realization, case serves as a proxy for grammatical subjecthood, etc. For surface realization it is therefore desirable to identify the case of a given noun phrase properly, in order to produce intelligible output.

One striking property of the German language is the pattern in which verbs are distributed in main and subordinate clauses. Most descriptive accounts of German syntax are based on a topology of a German sentence that treats the position of the verb as the fixed frame around which other syntactic constituents are organized in a relatively free order.

As is known, the general form of German sentences includes left and right bracket verbal positions which separate three fields, a pre-field, a middle field, and a post-field. The pre-field typically contains at most one constituent. The left bracket verb position contains the finite verb, a subordinating conjunction, or a relative pronoun/relative expression. The middle field can contain any number of constituents and the right verbal bracket contains all of the verbal material that is not present in the left bracket. The post-field typically contains clausal complements, subordinate clauses, extraposed material (e.g., relative clauses extraposed from the middle field) or other constituents.

Depending on the position of the finite verb, German sentences and verb phrases are often classified as being "verb-initial" "verb-second" or "verb-final". In verb-initial clauses, the finite verb is in the initial position. Verb-second sentences contain material in the pre-field, and the finite verb in the left bracket position, and verb-final sentences contain no verbal element in the left bracket. This usually occurs because the left bracket is occupied by a subordinating conjunction or a relative pronoun.

In accordance with one embodiment of the present invention, a decision tree classifier is used to assign features that indicate the verb-positioning pattern in the constituent. Downstream components and functions then utilize the information present in these features.

After verb positioning features have been assigned, the fleshing out operation is complete and the degraphed structure with the added syntactic and other information is provided as output 222 in FIG. 2. FIG. 7 illustrates the degraphed logical form in accordance with the example under discussion, after it has been fleshed-out.

Figure 8:
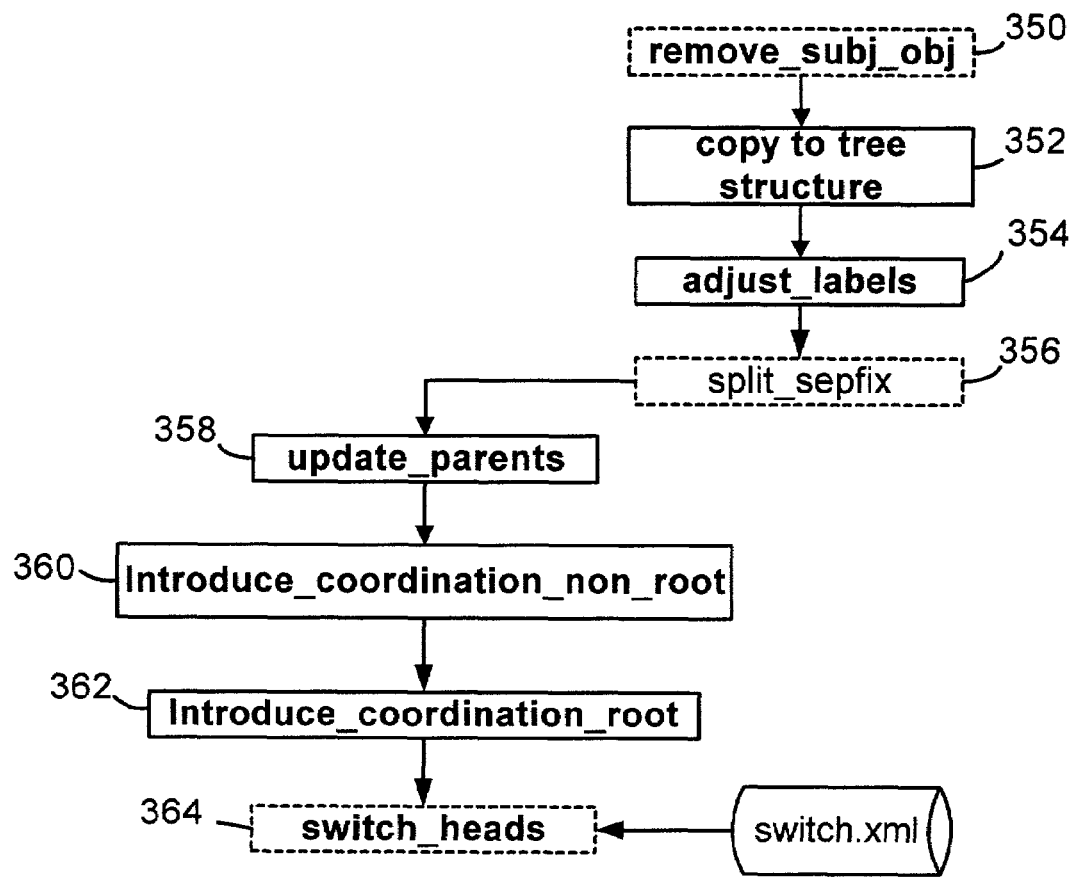
FIG. 8 is a flow diagram illustrating the operation of the basic tree conversion component.

The fleshed-out and degraphed logical form 222 is then provided to basic tree conversion component 206 (shown in FIG. 2) where it is converted into a basic syntax tree structure. FIG. 8 is a flow diagram better illustrating the operation of basic tree conversion component 206. The conversion is performed by conducting a recursive read-off of the degraphed logical form into a tree structure. In doing this conversion, the first operation is to remove the logical subjects and objects which have a low probability of overt realization, as indicated by block 350. Recall that this probability was assigned by a decision tree classifier during the flesh-out operation.

Next, the degraphed logical form is mapped or copied to a tree structure as indicated by block 352 in FIG. 8. In doing this, the labels on non-terminal nodes of the tree are copied over from the nodes in the degraphed logical form (recall that the labels have been assigned during flesh-out). This is indicated by block 354 in FIG. 8.

Next, and specifically for the German language, separable prefixes are split from their stem, based on verb-position features assigned in the flesh-out stage, and based on lexical information (such as from the dictionary, inserted during preprocessing) about the boundary between the prefix and the stem. Splitting separable prefixes is indicated by block 356 in FIG. 8.

Splitting the verb into a stem and separable prefix is triggered under the following conditions:
1. The verb is actually a separable prefix verb (as indicated by a lexical feature); and
2. The verb occurs in a context where the stem should be separated (either in a verb-initial or in a verb-second structure, with no auxiliary or modal verb present that would carry the finiteness features).

If these conditions hold, lexical information on the verb determines where the split between stem and prefix should be made. The node is split into a STEM and a PREFIX node, and verb inflectional features are copied over to the stem.

The Parents attribute for each node is then updated based on the previous steps in FIG. 8. This is indicated by block 358 in FIG. 8.

In the next two steps 360 and 362, the representation of coordination is mapped from the way it is handled in the abstract input (in the logical form) to a more surface-oriented structure. Coordination is a difficult aspect of natural language and is represented in different ways at the logical form level (at the abstract representation level) and during syntactic analysis. Syntactically, a conjunction can be treated as the head of a coordinated construction, with the coordinated phrases and additional conjunctions in the pre- and post-modifiers of that head. Semantically, there may be no single node for the coordinated phrase. Rather, each of the coordinated phrases has its own node, and enters into semantic relations by itself. In addition, each of the coordinated nodes maintains pointers to the semantic nodes of the other phrases that it is coordinated with in an attribute referred to herein as "CoCoords". This idiosyncratic logical form representation is simplified by the two functions illustrated in steps 360 and 362.

Step 360 introduces coordination non-roots, while step 362 introduces coordination roots. These two functions simplify the representation by adapting the tree structure that has been built directly from the degraphed logical form representation to the syntactic representation strategy. In essence, the functions convert the CoCoords attribute into coordinated syntactic nodes, with the conjunction as the head.

The final step 364 in FIG. 8 is referred to as the "Switch Heads" operation and is illustratively performed by a decision tree classifier. This step embodies the conversion to the basic tree, and the decision tree classifier reverses syntactic dominance relations in those contexts where syntactic and semantic dominance relations are at odds. Typically in German this occurs in quantificational examples of the kind "viele der Leute" where "viele" is the syntactic head but "Leute" is the semantic one.

Figure 9:
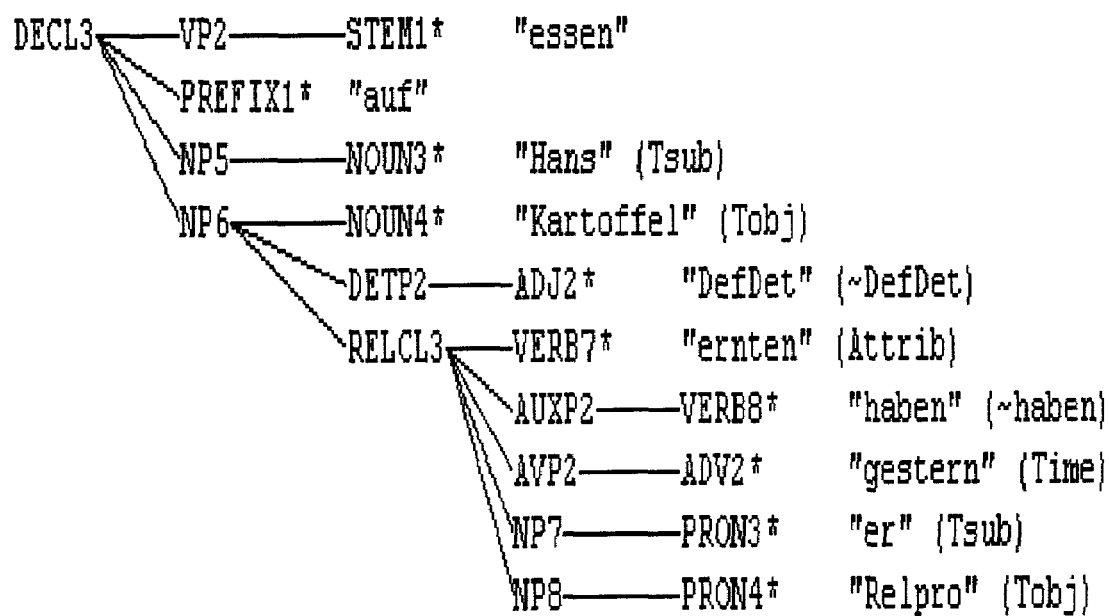
FIG. 9 illustrates a basic tree output by the basic tree conversion component.
Figure 10:
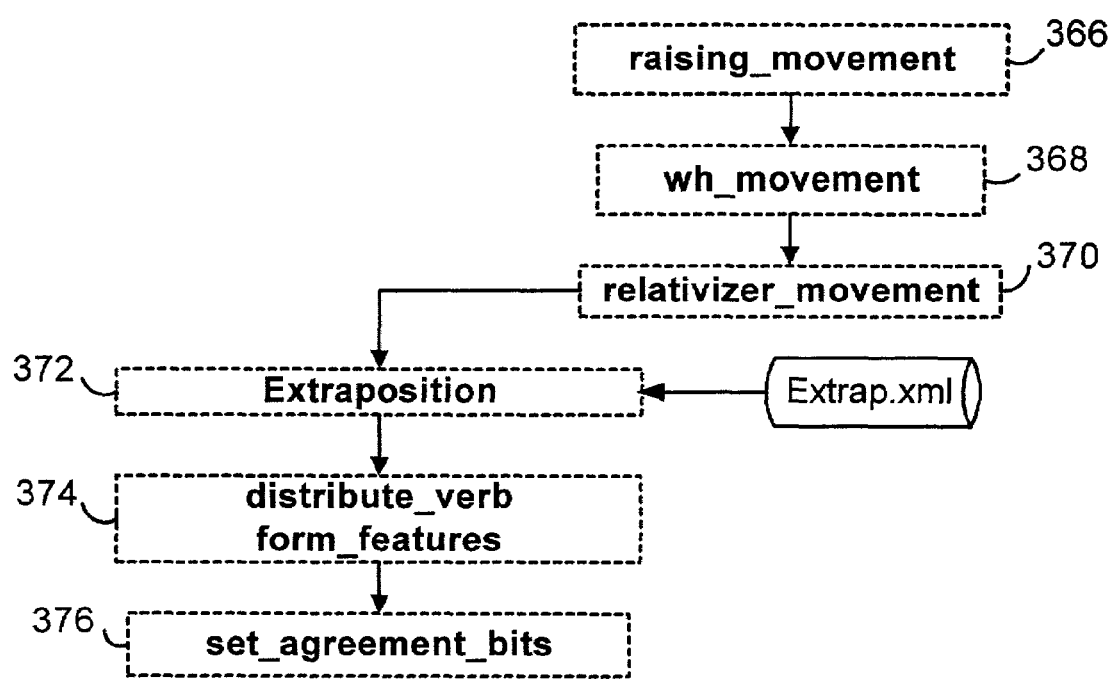
FIG. 10 is a flow diagram better illustrating the global movement component.

FIG. 9 illustrates a basic tree structure for the example sentence, after processing by basic tree conversion component 206. This structure is then provided to global movement component 208. FIG. 10 is a flow diagram better illustrating the operation of global movement component 208 shown in FIG. 2.

During global movement, non-local movement operations are performed. Non-local, in this context, means movement beyond the limits of the immediate parent. All "local" movement in accordance with one embodiment of the present invention is treated as an ordering phenomenon within one constituent, instead of as a genuine movement. While raising, Wh-movement and the movement of relative pronouns/relative expressions are handled in the present example by simple rule-based functions, they could also be dealt with by a machine-learned system, such as a decision tree classifier.

In any case, once global movement component 208 receives structure 224, it first performs raising movement as indicated by block 366 in FIG. 10. In accordance with one embodiment, two different raising functions are performed. One function raises nodes from adjective phrases (AJPs) and noun phrases (NPs) to the level of the copular verb in the predicative context. The other function raises subjects of raising verbs.

After the raising functions are performed, the Wh movement function is performed as illustrated by block 368 in FIG. 10. Wh movement is triggered if the structure contains a phrase marked by the "Wh" feature that is not dominated by another "Wh" or "WhQ" phrase (a direct or indirect Wh question) and if that phrase has an ancestor higher up in the tree that is marked as "WhQ". Once this context is detected, the Wh phrases is moved up to the WhQ node.

Movement of relative pronouns or expressions is illustrated by block 370 in FIG. 10 and operates in a similar fashion to Wh movement, except that the triggering context is the presence of a relative pronoun that is not dominated by a relative clause. In this context, the relative pronoun is moved up to the first relative clause in its parent chain.

Extraposition processing is then performed. This is indicated by block 372 in FIG. 10. In a variety of languages, it is possible to extrapose clausal material to the right periphery of the sentence. For example, in German and English, this can be done with relative clauses. One example of these clauses is as follows:

"The man entered the room who usually causes trouble right away."

"Der Mann hat den Raum betreten, der üblicherweise immer Ärger macht."

A relative clause modifying "the man" has been shifted to the right edge of the sentence. This is particularly prevalent in languages such as German where it has been observed that nearly one-third of relative clauses are extraposed in technical writing.

The same is true, for example, with infinitival clauses:

"The possibility was considered to leave the country."

"Man hat die Möglichkeit erwogen, das Land zu verlassen."

The same can be observed with complement clauses such as:

"A rumor has been circulating that he is ill."

"Ein Gerucht ging um, dass er krank ist."

In this embodiment of the present invention, it is determined for each extraposable node (Infcl, Compcl, Relcl) whether the node should move up one step from its current attachment (i.e., from its parent node) to the next higher node (i.e., to its grandparent node). From the new position, another assessment is made for the next possible movement step, etc. Each movement is evaluated until a position is found where the probability of further movement is less than a predetermined threshold, such as 0.5. A trace is left behind in the original position with a pointer to the extraposed clause. In addition, a pointer is provided in the extraposed clause back to its original position.

The final two steps shown in FIG. 10 and represented by numerals 374 and 376 are functions that assign morphological features for verbs based on the information present in the tree nodes. The first function (Distribution of Verb-form Features) identifies the finite verb (which can be an inserted auxiliary, or modal) and shifts the tense, mood, and finiteness features to that verb. This function also marks the non-auxiliary verb as past participle if the construction is marked as perfective or passive, and it marks verbs as infinitives if a modal verb is present and there is no passive or perfective context.

The second function (Set Agreement Bits) identifies the grammatical subject as a nominative noun phrase that is in the domain of the verb. It then copies person and number features of that noun phrase onto the finite verb. If no grammatical subject is found, a default assignment of third person singular is made.

Figure 11:
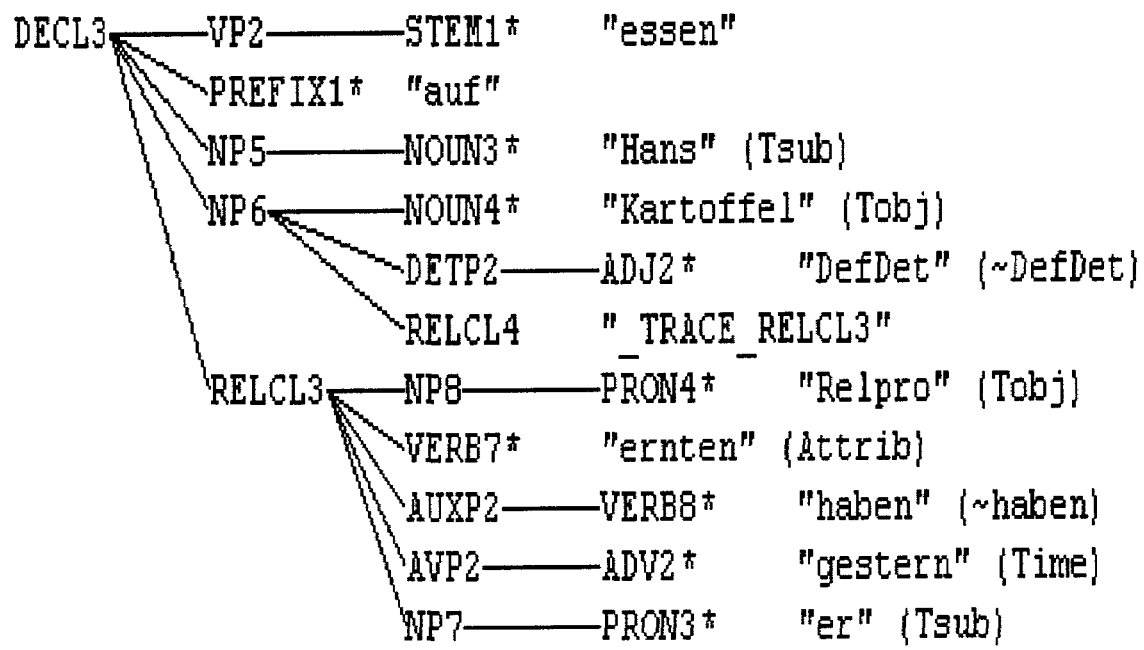
FIG. 11 illustrates the output of the global movement component.

FIG. 11 illustrates the output of global movement component 208. It can specifically be seen that in the example shown, extraposition of the relative clause has taken place.

Figure 12:
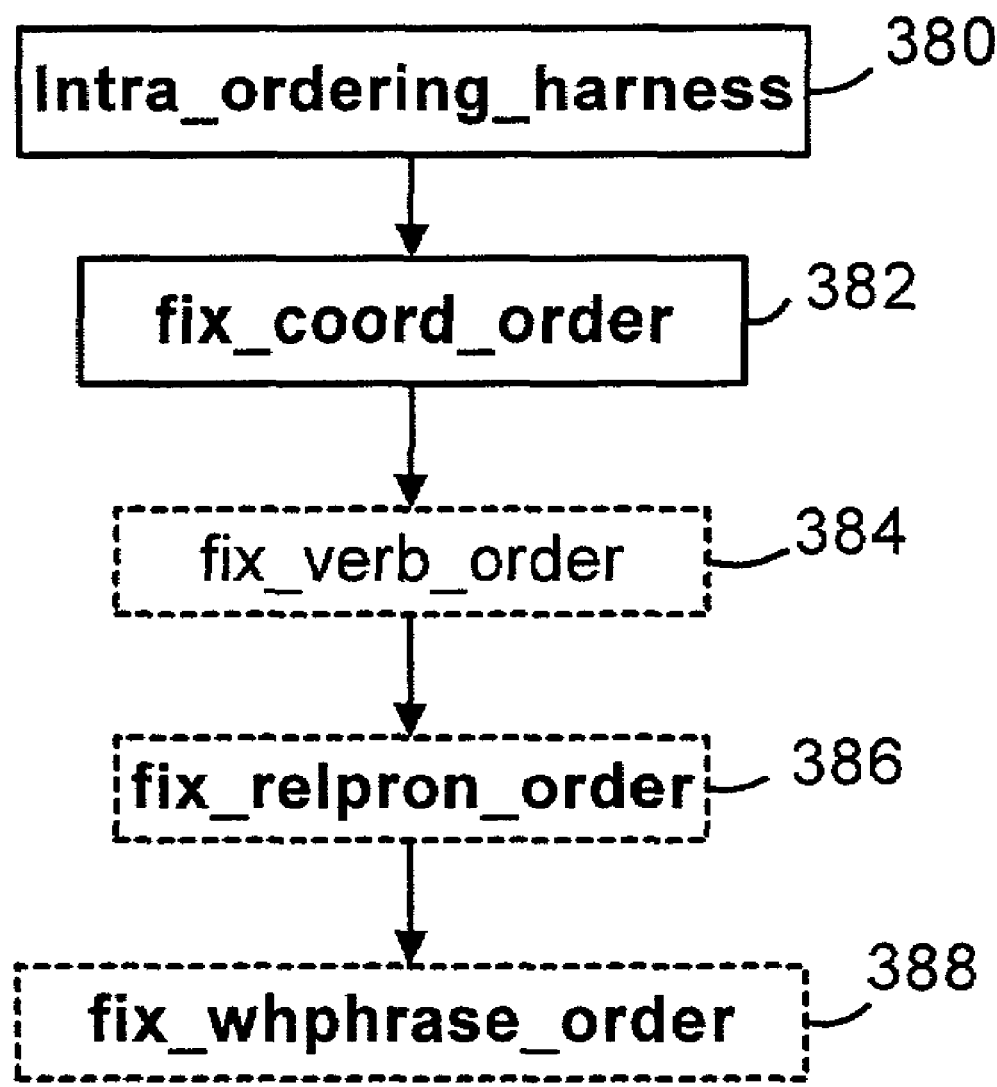
FIG. 12 is a flow diagram better illustrating the operation of the intra-constituent ordering component.

The output illustrated in FIG. 11 is then input to intra-constituent ordering component 210 (shown in FIG. 2). FIG. 12 is a flow diagram better illustrating the operation of intra-constituent ordering component 210.

The ordering of words and constituents varies across languages, as does the rigidity with which the canonical order has to be obeyed. The present examples will be discussed with respect to the English and German languages, since neither English nor German show examples where individual words can be ordered freely, outside of the immediate constituent that they belong to.

English has a relatively rigid constituent order, although a number of preposing and extraposing operations can alter that order. Thus, it is overly-simplistic to describe English as having "fixed" constituent order.

German, on the other hand, allows many major constituents to be rather freely distributed among the pre-field and middle-field, and to a somewhat lesser extent, to the post-field. At the same time, the position of the verb is fixed to the two bracket positions discussed above. Thus, it can be seen that word order plays a crucial role in establishing the fluency and intelligibility of a sentence.

Given a syntactic tree with unordered constituents for a sentence, one aspect of the present invention establishes linear order within each constituent, so that each modifier is placed in its proper position. Intra-constituent ordering component 210 can thus handle each constituent independently and in isolation, but the net effect is to establish linear order among all leaves of the tree.

Figure 12A:
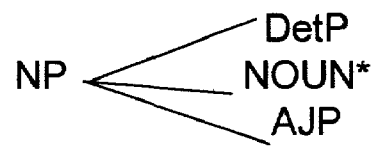
FIGS. 12A and 12B illustrate operation of the intra-constituent ordering component.

FIG. 12A shows one node from a hierarchically ordered tree for purposes of illustration. The node is a noun phrase (NP) and has three child nodes, a determiner phrase (DetP), a noun (Noun) which is the head indicated by the asterisk, and an adjective phrase (AJP). Furthermore, the Noun is linked to each of its modifiers by a semantic relation as follows:

Noun→~DefDet→DetP

And

Noun→~Attrib→AJP

The intra-constituent ordering component orders each of the child nodes relative to one another. Thus, it can be seen that there are six possible orderings for the three nodes as indicated below:

DetP AJP Noun*
AJP Noun* DetP
Noun* AJP DetP
Noun* DetP AJP
DetP Noun* AJP
AJP DetP Noun*

In order to determine the proper ordering of the three child nodes (i.e., in order to select the best possibility or possibilities indicated above) intra-constituent ordering component 210 begins with the head node (in this case the Noun) and performs a staged search though all of the possibilities. If there are M child nodes, then the number of stages in the search is M-1.

Figure 12B:
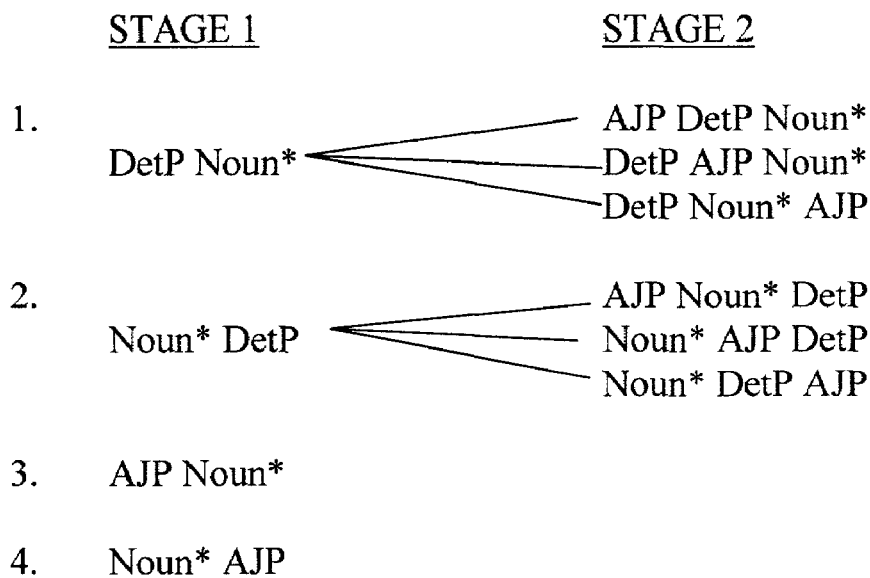

FIG. 12B illustrates this search with respect to the example shown in FIG. 12A. Since there are three child nodes, there are two stages in the search. In stage 1, component 210 begins with the head node (the noun) and enumerates all possibilities with respect to the remaining child nodes relative to the head node. Thus, it can be seen that there are four possibilities with respect to the ordering of the head node and the remaining child nodes. Each of these hypothesized orderings are scored using a language model (in one embodiment, with a bi-gram language model on nodetype and semantic relation) and are placed in ranked order.

Assume for the sake of example that the four possibilities shown in FIG. 12B are in ranked order according to their score. In the next stage, component 210 extends each hypothesis from the preceding stage in all possible ways by introducing an additional child node from the set of remaining nodes. In the present example, it can be seen that hypothesis one from stage one will spawn three different hypotheses in stage two, and hypothesis two from stage one will also spawn three different hypotheses in stage two. All of the hypotheses in stage two that would be spawned from hypotheses three and four in stage one are duplicates of those developed by extending hypotheses one and two from stage one into stage two. In an illustrative embodiment, the per-stage lists are maintained in priority queues containing only unique items. Thus, lists of unique orderings are maintained in rank order and without duplicates.

For each of the hypotheses spawned in stage two, component 210 computes the score by applying the language model to the extended sequence. The scored hypotheses are again placed in rank order, and those with scores above a threshold level (above a beam) are carried forward to the next stage, if any. Component 210 illustratively applies the language model from the head node outward in each direction, one constituent at a time. It can be seen that since the hypotheses from a previous stage spawn multiple additional hypotheses in a subsequent stage, the search space can grow quite quickly. However, using this beam search technique, the best hypotheses can be explored while maintaining the search space at a desirably low level.

In one illustrative embodiment, component 210 employs a generative statistical language model to score possible orders among a head and its modifiers as illustrated above.

For a given constituent the model assigns a probability to modifier n-grams in the context of several relevant features. Many features can be used as relevant context, such as the node type of the parent of the head (i.e., the constituent type), the node type of the head (i.e. part of speech), verb position bits on the parent of the head, the lemma of the head, and the node type of the grandparent of the head, among other possibilities. Furthermore, many features of the constituents to be ordered can be used, including node type (part of speech), semantic relation to the head constituent, lemma, and other lexical, syntactic, and semantic features.

In one illustrative embodiment, the model first predicts the semantic relation (from the logical form) of each modifier. This is done in the constituent contexts and in the context of the preceding n−1 neighbors. The model then predicts the node type (syntactic category) of the modifier.

Figure 12C:
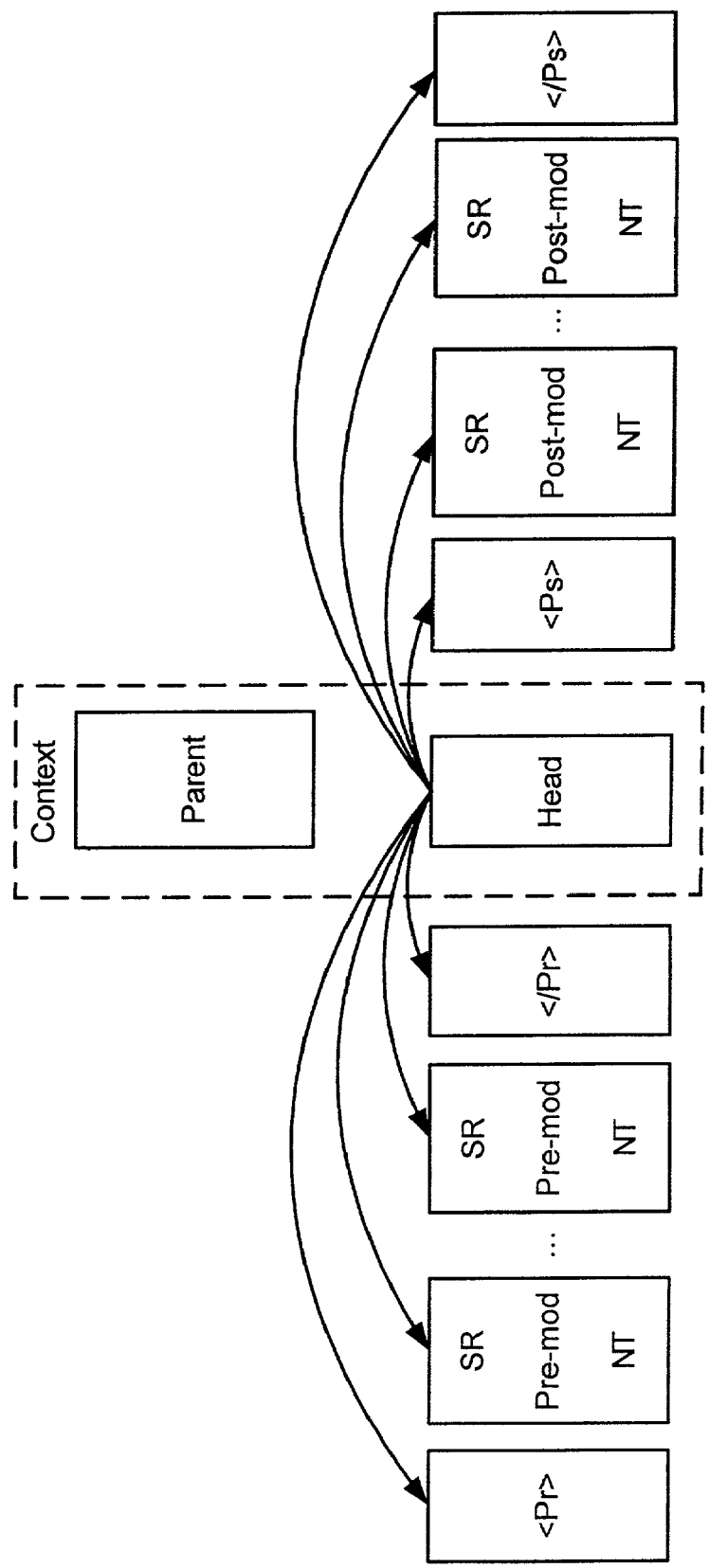
FIG. 12C further illustrates operation of the intra-constituent ordering component.

FIG. 12C is another illustration showing the operation of the model. The model is split into a model of head pre-modifier order (pre-modifiers lie to the left of the Head in FIG. 12C) and post-modifier order (post-modifiers lie to the right of the Head in FIG. 12C). Included in the notion of neighbor are explicit pseudo-modifiers for marking the beginning and the end of the pre-modifiers (<Pr>and </Pr>, respectively) and for marking the end points of the post-modifiers (<Ps>and </Ps>). Hence, for any Parent/Head context, the model includes an n-gram distribution for pre-modifiers and an n-gram distribution for post-modifiers.

To elaborate on the previous example, consider the hypothesis Hi consisting of the sequence "DetP AJP Noun*". It is scored by working out from the head (in this case, there are only pre-modifiers). As mentioned above, for the benefit of the model, we mark the beginning of the pre-modifers (with <Pr>) and the end of the pre-modifiers (with </Pr>). We do the same for the post-modifiers (with <Ps>and </Ps>). The resulting sequence is (<Pr>DetP AJP </Pr>Noun* <Ps> </Ps>). Note that an empty post-modifier sequence is significant and does contribute to the overall score for the hypothesis. The score P(H1) is computed as follows:

P(H1)=
P(</Pr>|Noun, NP)
×P(</Pr>|</Pr>, Noun, NP)
×P(Attrib|</Pr>, </Pr>, Noun, NP)
×P(AJP|Attrib, </Pr>, </Pr>, Noun, NP)
×P(~DefDet|AJP, Attrib, </Pr>, </Pr>, Noun, NP)
×P(DetP|~DefDet, AJP, Attrib, </Pr>, </Pr>, Noun, NP)
×P(<Pr>|DetP, ~DefDet, AJP, Attrib, </Pr>, </Pr>, Noun, NP)
×P(<Pr>|<Pr>, DetP, ~DefDet, AJP, Attrib, </Pr>, </Pr>, Noun, NP)
×P(<Ps>|Noun, NP)
×P(<Ps>|<Ps>, Noun, NP)
×P(</Ps>|<Ps>, <Ps>, Noun, NP)
×P(</Ps>|</Ps>, <Ps>, <Ps>, Noun, NP)

Each of these probabilities can be estimated by looking at a limited number of predecessor nodes to the right (for pre-modifier sequences) or to the left (for post-modifier sequences). In an illustrative embodiment, this number can be restricted to one, yielding a bi-gram model, or two, yielding a tri-gram model. Furthermore, these probability distributions can be smoothed using any of the available approaches to smoothing known to those skilled in the art.

The ordering stage searches among all possible orders or at least among the most promising orders. As discussed above, the search proceeds by considering all possible incomplete orderings of length one, then those of length two, and so on, up to all possible complete orderings of length n. Each step in the search can be pruned to consider only those incomplete ordering hypotheses for which the model assigns a sufficiently high score. This search produces as many scored order hypotheses as desired. If the number of members in the constituent (counting the head and its modifiers) equals n, then there are n! possible orderings. Thus, for a relatively large constituent, the search space can be overwhelming. The beam search thus puts a practical limit on the complexity of the complete search.

This intra-constituent ordering model is represented by block 380 in FIG. 12. There are some additional linguistic constraints that can be used to modify the output of the ordering stage in step 380, if needed. One constraint involves ordering in coordination, which ensures that conjunctions and coordinated phrases are in alternating order. This is indicated by block 382 in FIG. 12. In a second constraint, verb positioning is adjusted according to the verb position features that have been assigned by a decision tree classifier in the flesh-out stage. The verb positioning function shifts the finite verb to the left bracket position in verb-second and verb-initial structures and ensures that all non-finite verbs are aligned in the right bracket position. Fixing verb order is indicated by block 384 in FIG. 12. In a third constraint, the order of relative pronouns is adjusted as indicated by block 386. This function moves relative pronouns to the beginning of the relative clause. Finally, the order of Wh phrases can be determined. This is indicated by block 388 in FIG. 12.

Figure 13:
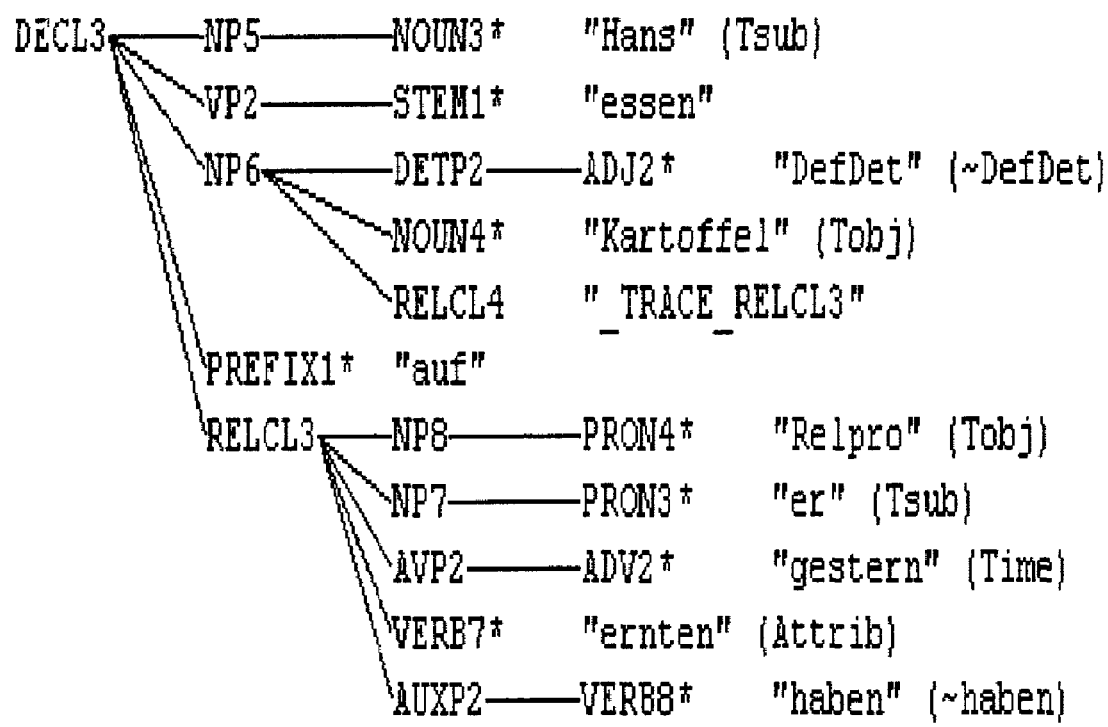
FIG. 13 illustrates the output of the intra-constituent ordering component.

For the sentence used as the example herein, FIG. 13 illustrates the ordered tree output by the intra-constituent ordering component 210. The structure illustrated in FIG. 13 is then provided to the surface cleanup component 212.

FIG. 14 is a flow diagram which better illustrates the operation of surface cleanup component 212. It can be seen from the structure in FIG. 13 that a number of things must still be done in order to arrive at a correct surface string. For example, there must be a surface realization of determiners. This is accomplished by a decision tree classifier (in the embodiment discussed herein) as illustrated by block 400 in FIG. 14. There are 55 different determiner forms which have been observed in the German training data. While the realization of the determiners can be specified by rule, it can also be determined by a decision tree classifier as discussed in Appendix 2 hereto. Thus, in the example currently under consideration, the abstract determiner "Defdet" is converted to its surface realization, namely "die".

In addition, the relative pronoun "RelPro" must be converted to its surface realization as well. While this is also done, in one embodiment, using a decision tree classifier, it could be done using a hand-crafted selection process as well. Surface realization of relative pronouns is indicated by block 410 in FIG. 14.

Figure 15:
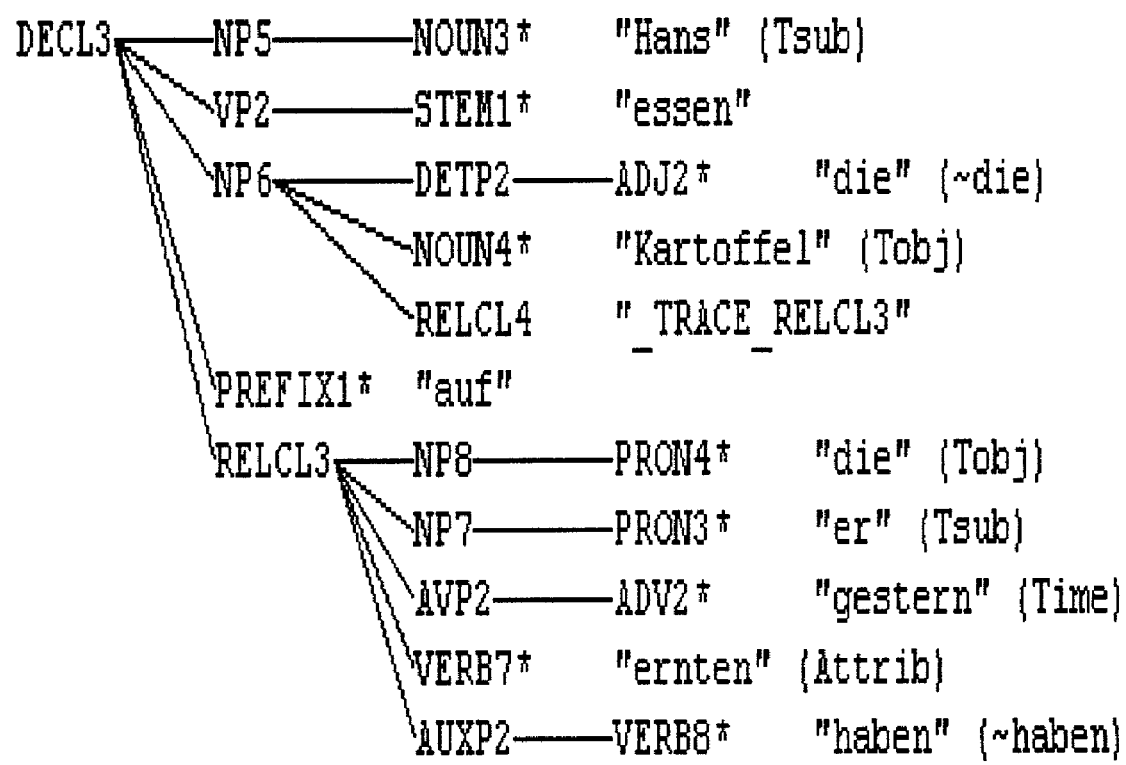
FIG. 15 illustrates the output of the surface clean-up component.

Reflexive pronouns which also received an abstract form during insertion in flesh-out, are converted into their surface form by a rule-based function. This is indicated by block 412 in FIG. 14. The results of these operations for the present example sentence are illustrated in FIG. 15 which is indicative of a clean, fully ordered syntax tree 230.

FIG. 14 shows that surface clean-up of stage 212 can contain additional functions which are not illustrated by the example currently being discussed. Such functions can include, for example, the reduction of duplication in coordinated constituents as indicated by block 414 in FIG. 14. To illustrate this function, consider a sentence such as:

"Hans hat die Kartoffeln gekocht und gegessen." (Hans has cooked and eaten the potatoes.) The logical form for this sentence correctly establishes semantic relations between each of the verbs "kochen" (cook) and "essen" (eat) and the subject "Hans" and object "die Kartoffeln" (the potatoes). However, mapped to a tree structure through the present invention, the surface string will encode all of the relations that were present in the input logical form, resulting in duplication as follows:

"Hans hat die Kartoffeln gekocht und Hans hat die Kartoffeln gegessen." (Hans has cooked the potatoes and Hans has eaten the potatoes).

While this is a perfectly grammatical German sentence, it is not a desired fluent output. Therefore, surface cleanup component 212 illustratively includes two operations that deal with the elimination of duplicates in coordination. The first operation indicated by numeral 414 in FIG. 14 is based on a decision tree classifier that establishes a probability of being overtly realized for each of the duplicated nodes in a coordination structure. The second operation illustrated by block 416 eliminates duplicated function words (such as prepositions and auxiliaries). These operations can be accomplished using machine-learned techniques or using rule-based procedures.

For example, in one embodiment, the first object and the second subject, and their associated function words, are deleted. This results in deletion of the first occurrence of "die Kartoffeln" (the potatoes) and the second occurrence of "Hans hat" (Hans has). Thus, the sentence reads "Hans hat gekocht und die Kartoffeln gegessen." (Hans has cooked and eaten the potatoes).

Once the ordered syntax tree has undergone surface cleanup at component 212, it is provided to punctuation insertion component 214 in FIG. 2. After punctuation is inserted, the tree is provided to inflectional generation component 216. FIG. 16 is a flow diagram better illustrating the operation of punctuation insertion component 214 and inflectional generation component 216.

Punctuation rules are difficult in German, and although more simplification has been achieved in the spelling reform, there are still 26 different rules for the correct positioning of the comma alone. Since punctuation conventions are typically in the form "insert punctuation x after y" or "insert punctuation x before y" two different decision tree classifiers are used for preceding and for following punctuation. In one illustrative embodiment, these models are only applied for sentence internal punctuation since sentence final punctuation can be inserted with a relatively simple rule-based function.

Figure 17:
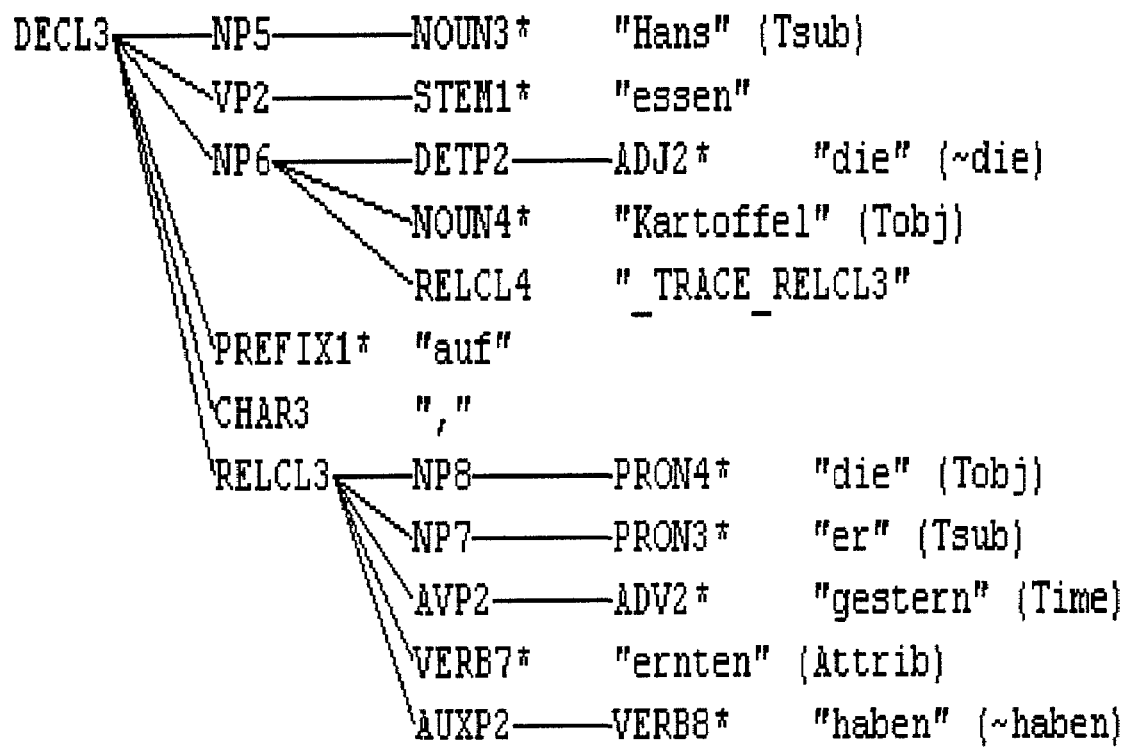
FIGS. 17 and 19 illustrate the output of the punctuation insertion component and the inflectional generation component, respectively.

In one embodiment, at each terminal node in the tree 230 provided to punctuation insertion component 214, the left edge of the terminal node, and the right edge of the preceding node are passed into the classifier for preceding and following punctuation, respectively. The verdicts from both classifiers are collected and if there is a strong prediction (such as, for example, greater than 0.5) for the insertion of punctuation, the strongest such prediction wins and the predicted punctuation mark is inserted into the tree. Punctuation labeling is indicated by block 420 in FIG. 16, and the fully punctuated syntax tree 232 for the present example is shown in FIG. 17.

A final stage prior to obtaining the final inflected tree 234 (shown in FIG. 2) is inflectional generation processing by inflectional generation component 216. German has a very rich system of inflectional morphology. Particularly important for sentence realization as well as parsing in German is case marking on noun phrases. There are four cases in German: nominative, accusative, dative and genitive. Depending on a number of factors such as the morphological class of the lexical items, the choice of determiner, number and gender, case can be morphologically realized on various elements of the noun phrase: the noun itself, the determiners and adjectives (if present). The importance of case marking in German sentence realization stems from the fact that because of its relatively free constituent order, case is often an important tool in determining the semantic role of a noun phrase in the clause. If an (e.g., active) clause contains a nominative and accusative noun phrase, the nominative phrase can safely be assumed to be the subject, and the accusative to be the object, independently of their linear order in the sentence string.

The records in the tree structure at this point in the pipeline (just prior to inflectional generation component 216) contain all necessary information to be passed into component 216. Features that are passed into the inflectional generation component 216 for German include case, gender, number, person, etc. As an example, the record of the node STEM1 in the tree shown in FIG. 17 is illustrated in FIG. 18. Based on the features Pers2 SingPres Indicat, the verb for "isst" can be generated from the lemma "essen". The terminal nodes in the syntactic tree, along with their inflectional bits and case information on nouns are passed into the generation function.

Figure 19:
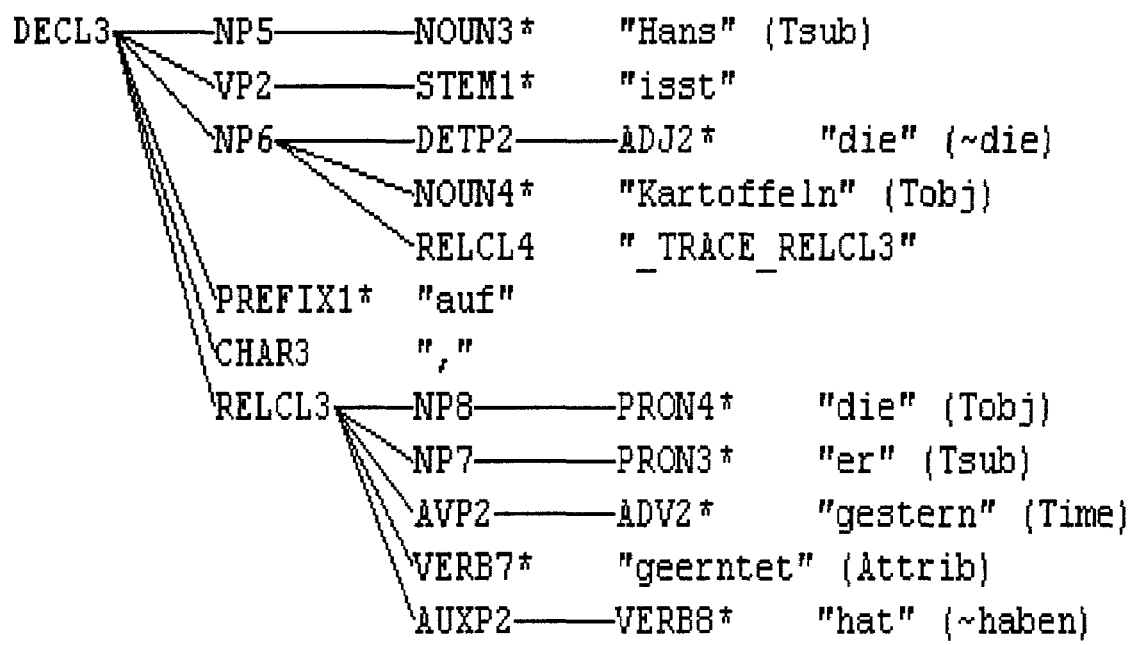

In one embodiment, the inflectional generation function is that which has been developed for the grammar checker in the "MICROSOFT®" Office products offered by the Microsoft Corporation of Redmond, Wash. This is but one example, and any others could be used for performing this type of morphological generation. This inflectional generation function utilizes a finite-state morphology. Performing inflectional generation is indicated by block 422 in FIG. 16. The final inflected syntax tree 234 provided by component 216 for the example under discussion is illustrated in FIG. 19.

Finally, tree reader component 218 simply reads the string off of the final inflected tree 234 to provide the surface string 236. In accordance with the present invention, the surface string corresponds exactly to the sentence represented by the abstract linguistic input and is:

"Hans isst die Kartoffeln auf, die er gestern geerntet hat." (Hans eats up the potatoes which he has harvested yesterday.) It can thus be seen that one embodiment of the present invention decomposes the entire process of sentence realization into a number of decision points. For some of these decision points, machine learned methods are used, while in others rule-based methods are used. Of course, most decision points can be implemented by either machine-learned components or rule-based components.

In one illustrative embodiment, at each decision point along the pipeline, only a threshold number of hypotheses are carried along to the next decision point. Thus, the present system does not enumerate every possible realization of a sentence. Instead, the hypotheses are ranked at each stage, and each stage passes on rank-ordered hypotheses that meet a predetermined threshold.

Each of the hypotheses passed on to a next stage can spawn multiple additional hypotheses in the next stage. Therefore, even in the present staged process, the search space could grow undesirably large. However, using the beam search technique, the present invention maintains the search space at a manageable size.

Of course, it should also be noted that the individual processing stages of the present overall system 200 are, in and of themselves, features of the present invention which can stand by themselves.

Similarly, a sentence realization system may not take as its abstract linguistic input a logical form but may take some other graph or dependency structure. In that case, the structure may enter the process illustrated in FIG. 2 at varying points along the pipeline. Thus, inventive concepts of the present invention can be used even where all processing stages are not used.

Similarly, it will certainly be noted that a number of the functions and processing stages discussed with respect to the present invention are specific to either English or German. In those cases, where different languages are being processed, the modules specific to English or German can simply be disabled or need not be present at all. Similarly, other modules or processing stages or functions specific to other desired languages can be added in the pipeline in accordance with the present invention without departing from the inventive concepts discussed herein.

Although the present invention has been described with reference to particular embodiments, workers skilled in the art will recognize that changes may be made in form and detail without departing from the spirit and scope of the invention.

What is claimed is:

1. A sentence realization system for processing an abstract linguistic representation (ALR) of a sentence into a structure that can be fully realized, comprising:

a tree conversion component configured for receiving the ALR and generating a basic syntax tree from the ALR, the basic syntax tree including parent and child nodes, the parent nodes being ancestor nodes to the child nodes;

a global movement component configured for receiving the basic syntax tree and hierarchically ordering child nodes relative to ancestor nodes to obtain a hierarchically ordered tree;

an intra-constituent ordering component configured for receiving the hierarchically ordered tree and establishing a linear order among the nodes in the hierarchically ordered tree to obtain a fully ordered tree;

a surface clean-up component configured for receiving the fully ordered tree and generating surface realizations for constituents in the fully ordered tree that are to be realized but are as yet abstract, to obtain a cleaned tree; and a surface realization component configured for outputting a text based at least in part on the cleaned tree;

wherein one or more of the components comprises a decision tree classifier.

2. The system of claim 1 and further comprising:

a punctuation insertion component inserting punctuation into the cleaned tree to obtain a punctuated tree.

3. The system of claim 2 and further comprising:

an inflection generation component receiving the punctuated tree and modifying the punctuated tree to reflect correct inflection.

4. The system of claim 2 wherein the punctuation component comprises:

a first punctuation model that models preceding punctuation.

5. The system of claim 4 wherein the punctuation component comprises:

a second punctuation model that models following punctuation.

6. The system of claim 5 wherein the first and second punctuation models are applied to sentence internal punctuation.

7. The system of claim 6 wherein the punctuation component is configured to implement a sentence final punctuation function to identify sentence final punctuation.

8. The system of claim 1 and further comprising:

a flesh-out component receiving the ALR prior to the tree conversion component and adding syntactic labels to nodes in the ALR.

9. The system of claim 8 wherein the flesh-out component is configured to insert function words in the ALR.

10. The system of claim 9 wherein the flesh-out component inserts auxiliaries.

11. The system of claim 9 wherein the flesh-out component inserts prepositions.

12. The system of claim 9 wherein the flesh-out component inserts negators.

13. The system of claim 9 wherein the flesh-out component inserts infinitival markers.

14. The system of claim 9 wherein the flesh-out component inserts subordinating conjunctions.

15. The system of claim 9 wherein the flesh-out component inserts expletive subjects.

16. The system of claim 9 wherein the flesh-out component inserts abstract relative pronouns.

17. The system of claim 9 wherein the flesh-out component inserts abstract reflexive pronouns.

18. the system of claim 9 wherein the flesh-out component inserts adverbial Wh words.

19. The system of claim 8 wherein the flesh-out component assigns a probability of realization to logical subjects and logical objects in the ALR.

20. The system of claim 19 wherein the basic tree conversion component is configured to remove logical subjects and logical objects having a probability of realization that is less than a threshold value.

21. The system of claim 20 wherein the basic tree conversion component is configured to copy labels from nodes in the ALR to non-terminal nodes in the basic syntax tree.

22. The system of claim 21 wherein the basic tree conversion component is configured to identify a node in the ALR that includes a lexical feature of a verb indicating that the verb has a stem and a separable prefix, to identify that the verb is in a separable context, and to split the identified node into a stem node and a prefix node.

23. The system of claim 20 wherein the basic tree conversion component is configured to identify coordinated constructions in the ALR and introduce coordinated syntactic nodes representative of the coordinated constructions.

24. The system of claim 23 wherein each coordinated construction is configured to include conjunctions alternating among the coordinated constituents.

25. The system of claim 20 wherein the basic tree conversion component is configured to identify contexts in the ALR in which syntactic and semantic dominance relations are inconsistent and to reverse the syntactic dominance relation in the identified contexts.

26. The system of claim 8 wherein the flesh-out component identifies case of noun phrases in the ALR.

27. The system of claim 8 wherein the flesh-out component assigns verb position to verbs in the ALR.

28. The system of claim 8 wherein the flesh-out component inserts abstract determiners.

29. The system of claim 1 wherein the ALR is a graph, and further comprising:
a preprocessing component, receiving the ALR and converting it to a tree structure in which each node in the ALR has at most one parent node.

30. The system of claim 29 wherein the preprocessing component is configured to perform a look-up operation in a lexical database for lexical items in the ALR and augment the tree structure with attributes indicative of lexical information from the look-up operation.

31. The system of claim 1 wherein the intra-constituent ordering component is configured to traverse the hierarchically ordered tree by selecting a parent node and linearly ordering each child node in the hierarchically ordered tree relative to other child nodes that have the selected parent node.

32. The system of claim 31 wherein each selected parent node has a corresponding head child node and wherein the intra-constituent ordering component is configured to generate order hypotheses that hypothesize an order of the child nodes relative to one another and score each order hypothesis.

33. The system of claim 32 wherein the intra-constituent ordering component is configured to generate each of the order hypotheses by, in a first processing stage, generating an order hypothesis for each one of the child nodes ordered as a modifier of the head child node.

34. The system of claim 33 wherein the intra-constituent ordering component is configured to compute a score associated with each order hypothesis.

35. The system of claim 34 wherein the intra-constituent ordering component is configured to, in a subsequent processing stage, generate an extended order hypothesis by adding another of the child nodes as a modifier to each desired order hypothesis generated in the first processing stage.

36. The system of claim 35 wherein the desired order hypotheses are those having a score that meets a threshold level.

37. The system of claim 36 wherein the intra-constituent ordering component is configured to generate a score for each extended order hypothesis.

38. The system of claim 37 wherein the selected parent node has m child nodes and wherein the intra-constituent ordering component is configured to repeat the subsequent processing stage for each extended hypothesis having a score that meets a desired threshold m-2 times.

39. The system of claim 37 wherein the intra-constituent ordering component includes an n-gram language model that generates the scores associated with the order hypotheses and the extended order hypotheses.

40. The system of claim 39 wherein the n-gram language model generates the scores by assigning probabilities to the order hypotheses and extended order hypotheses based on a semantic relation between each modifier and the head child node.

41. The system of claim 1 wherein the surface clean-up component is configured to convert abstract relative pronouns m the fully ordered tree to a surface realization.

42. The system of claim 1 wherein the surface clean-up component is configured to convert abstract determiners in the fully ordered tree to a surface realization.

43. The system of claim 1 wherein the surface clean-up component is configured to convert abstract reflexive pronouns in the fully ordered tree to a surface realization.

44. The system of claim 1 wherein the surface clean-up component is configured to identify instances of duplicated constituents in coordination in the fully ordered tree and to reduce duplication in the identified instances.

45. The system of claim 1 wherein the global movement component is configured to determine whether each child node is to be moved to depend from a different ancestor node and, if so, re-ordering the child node to depend from the different ancestor node.

46. The system of claim 45 wherein the global movement component is configured to identify an extraposable node and determine whether the identified node is to be moved to depend from a different ancestor node and, if so, move the identified node to depend from the different ancestor node.

47. The system of claim 45 wherein the global movement component is configured to identify predicative contexts and copular verbs in the basic syntax tree and to raise nodes from adjective phrases and noun phrases to a level of the copular verb in the identified contexts.

48. The system of claim 45 wherein the global movement component is configured to identify raising verbs and raise subjects of the identified raising verbs.

49. The system of claim 45 wherein the global movement component is configured to identify nodes representative of Wh phrases in the basic syntax tree that are not dominated by another Wh or Wh question phrase and to determine whether the identified node has an ancestor node that represents a Wh question phrase and, if so, move the identified node to depend from the ancestor node.

50. The system of claim 45 wherein the global movement component is configured to identify nodes representative of relative pronouns in the basic syntax tree that are not dominated by a relative clause and to determine whether the identified node has an ancestor node that represents a relative clause and, if so, move the identified node to depend from the ancestor node.

51. The system of claim 45 wherein the global movement component is configured to distribute inflectional features to verbal targets in the basic syntax tree.

52. The system of claim 51 wherein the global movement component is configured to distribute inflectional features to verbal targets in the basic syntax tree by identifying finite verbs in the basic syntax tree and shifting tense, mood and finiteness features to the identified verb.

53. The system of claim 51 wherein the global movement component is configured to distribute inflectional features to verbal targets in the basic syntax tree by identifying a grammatical subject as a nominative noun phrase in a domain of the verbal target and copy person and number features of the noun phrase to a finite verb.

54. The system of claim 53 wherein the global movement component is configured to assign the verbal target third person singular features if no grammatical subject is identified.

55. An ordering system for sentence realization, configured for ordering constituents of a tree structure representative of a sentence to be realized, the tree structure having child and ancestor nodes, the ordering system comprising:
   an intra-constituent ordering component comprising a decision tree classifier and configured for establishing a linear order among the nodes in the tree structure to obtain a fully ordered tree; and
   a surface realization component configured for outputting a text based at least in part on the fully ordered tree.

56. The system of claim 55 wherein the intra-constituent ordering component is configured to traverse the tree structure by selecting a parent node and linearly ordering each child node in the tree relative to other child nodes that have the selected parent node.

57. The system of claim 56 wherein each selected parent node has a corresponding head child node and wherein the intra-constituent ordering component is configured to generate order hypotheses that hypothesize an order of the child nodes relative to one another.

58. The system of claim 57 wherein the intra-constituent ordering component is configured to generate each of the order hypotheses by, in a first processing stage, generating an order hypothesis for each one of the child nodes ordered as a modifier of the head child node.

59. The system of claim 58 wherein the intra-constituent ordering component is configured to compute a score associated with each order hypothesis.

60. The system of claim 59 wherein the intra-constituent ordering component is configured to, in a subsequent processing stage, generate an extended order hypothesis by adding another of the child nodes as a modifier to each desired order hypothesis generated in the first processing stage.

61. The system of claim 60 wherein the desired order hypotheses are those having a score that meets a threshold level.

62. The system of claim 61 wherein the intra-constituent ordering component is configured to generate a score for each extended order hypothesis.

63. The system of claim 62 wherein the selected parent node has m child nodes and wherein the intra-constituent ordering component is configured to repeat the subsequent processing stage for each extended hypothesis having a score that meets a desired threshold m-2 times.

64. The system of claim 62 wherein the intra-constituent ordering component includes an n-gram language model that generates the scores associated with the order hypotheses and the extended order hypotheses.

65. An ordering system for sentence realization, configured for ordering a tree structure representative of a sentence to be realized, the tree structure having child and ancestor nodes, the ordering system comprising:
   a global movement component comprising a decision tree classifier and configured for receiving the tree structure and hierarchically ordering child nodes relative to ancestor nodes to obtain a hierarchically ordered tree, and providing as an output the hierarchically ordered tree; and
   a surface realization component configured for outputting a text based at least in part on the hierarchically ordered tree.

66. The system of claim 65 wherein the global movement component is configured to determine whether each child node is to be moved to depend from a different ancestor node and, if so, re-ordering the child node to depend from the different ancestor node.

67. The system of claim 66 wherein the global movement component is configured to identify predicative contexts and copular verbs in the tree structure and to raise nodes from adjective phrases and noun phrases to a level of the copular verb in the identified contexts.

68. The system of claim 66 wherein the global movement component is configured to identify raising verbs and raise subjects of the identified raising verbs.

69. The system of claim 66 wherein the global movement component is configured to identify nodes representative of Wh phrases in the tree structure that are not dominated by another Wh or WhQ question phrase and to determine whether the identified node has an ancestor node that represents a Wh question phrase and, if so, move the identified node to depend from the ancestor node.

70. The system of claim 66 wherein the global movement component is configured to identify nodes representative of relative pronouns in the tree structure that are not dominated by another relative clause and to determine whether the identified node has an ancestor node that represents a relative clause and, if so, move the identified node to depend from the ancestor node.

71. The system of claim 66 wherein the global movement component is configured to distribute inflectional features to verbal targets in the basic syntax tree.

72. The system of claim 71 wherein the global movement component is configured to distribute inflectional features to verbal targets in the tree structure by identifying finite verbs in the tree structure and shifting tense, mood and finiteness features to the identified verb.

73. The system of claim 71 wherein the global movement component is configured to distribute inflectional features to verbal targets in the tree structure by identifying a grammatical subject as a nominative noun phrase in a domain of the verbal target and copy person and number features of the noun phrase to a finite verb.

74. The system of claim 73 wherein the global movement component is configured to assign the verbal target third person singular features if no grammatical subject is identified.

75. A system configured for augmenting an abstract linguistic representation (ALR) of a sentence for sentence realization, the system comprising:
   a flesh-out component receiving the ALR and adding syntactic labels to nodes in the ALR to obtain an augmented ALR;
   a tree conversion component converting the augmented ALR to a basic syntax tree; and a surface realization component configured for outputting a text based at least in part on the basic syntax tree;

wherein one or more of the components comprises a decision tree classifier.

76. The system of claim 75 wherein the flesh-out component is configured to insert function words in the ALR.

77. The system of claim 76 wherein the flesh-out component assigns a probability of realization to logical subjects and logical objects in the ALR.

78. The system of claim 76 wherein the flesh-out component identifies case of noun phrases in the ALR.

79. The system of claim 76 wherein the flesh-out component assigns verb position to verbs in the ALR.

80. The system of claim 76 wherein the flesh-out component inserts abstract determiners.

81. The system of claim 76 wherein the flesh-out component inserts auxiliaries.

82. The system of claim 76 wherein the flesh-out component inserts prepositions.

83. The system of claim 76 wherein the flesh-out component inserts negators.

84. The system of claim 76 wherein the flesh-out component inserts infinitival markers.

85. The system of claim 76 wherein the flesh-out component inserts subordinating conjunctions.

86. The system of claim 76 wherein the flesh-out component inserts expletive subjects.

87. The system of claim 76 wherein the flesh-out component inserts abstract relative pronouns.

88. The system of claim 76 wherein the flesh-out component inserts abstract reflexive pronouns.

89. The system of claim 76 wherein the flesh-out component inserts adverbial Wh words.

90. The system of claim 75 wherein the tree conversion component is configured to remove logical subjects and logical objects having a probability of realization that is less than a threshold value.

91. The system of claim 90 wherein the basic syntax tree includes parent and child nodes, the parent nodes being ancestor nodes to the child nodes and wherein the basic tree conversion component is configured to copy labels from nodes in the ALR to non-terminal nodes in the basic syntax tree.

92. The system of claim 91 wherein the basic tree conversion component is configured to identify a node in the ALR that includes a lexical feature of a verb indicating that the verb has a stem and a separable prefix, and to identify that the verb is in a separable context, and to split the identified node into a stem node and a prefix node.

93. The system of claim 91 wherein the basic tree conversion component is configured to identify coordinated constructions in the ALR and introduce coordinated syntactic nodes representative of the coordinated constructions.

94. The system of claim 93 wherein each coordinated construction is configured to include conjunctions alternating among the coordinated constituents.

95. The system of claim 94 wherein the tree conversion component is configured to identify contexts in the ALR in which syntactic and semantic dominance relations are inconsistent and to reverse the syntactic dominance relation in the identified contexts.

* * * * *